United States Patent [19]
Arima

[11] Patent Number: 5,212,766
[45] Date of Patent: May 18, 1993

[54] NEURAL NETWORK REPRESENTING APPARATUS HAVING SELF-ORGANIZING FUNCTION

[75] Inventor: Yutaka Arima, Hyogo, Japan

[73] Assignee: Mitsubishi Denki Kabushiki Kaisha, Tokyo, Japan

[21] Appl. No.: 634,352

[22] Filed: Dec. 26, 1990

[30] Foreign Application Priority Data

Jan. 11, 1990 [JP] Japan .................. 2-4747

[51] Int. Cl.$^5$ .............................................. G06F 7/00
[52] U.S. Cl. ........................................ 395/24; 395/23
[58] Field of Search ................................... 395/23, 24

[56] References Cited

U.S. PATENT DOCUMENTS

| | | | |
|---|---|---|---|
| 4,962,342 | 10/1990 | Mead et al. | 395/24 |
| 5,004,932 | 4/1991 | Nejime | 395/24 |
| 5,021,988 | 6/1991 | Mashiro | 395/24 |
| 5,050,096 | 9/1991 | Seidman | 395/24 |
| 5,053,638 | 10/1991 | Furutani et al. | 395/24 |
| 5,072,130 | 12/1991 | Dobson | 395/24 |

OTHER PUBLICATIONS

"An Artificial Neural Network Integrated Circuit Based on MNOS/CCD Principles", Sag et al, AIP Conference Preceeding 1986.
"Presynaptic Neural Information Processing" Carley et al, American Institute of Physics 1988.
"Neurosoftware:Descriptions of Neural Network Structure" Hecht-Nilson, Robert 1990.
"VLSI Architectures for Neural Networks" Treleaven et al, IEEE Micro 1989.
"Performance of a Stochastic Learning Microchip", Alspector et al, Advances in Neural Information Processing System 1, 1989.
"Analog VLSI Synapticmatrices" Rossetto et al., IEEE Micro, 1989.
"A Geometrical Approach to Neural Network Design", Ramacher et al, Procc. of Int. Joint Conf. on Neural Network 1989.
"A Neuromorphic VLSI Learning System" by J. Alspector et al, Advanced Research in VLSI 1987 issued by MIT Press, pp. 313-327.

Primary Examiner—Michael R. Fleming
Assistant Examiner—George Davis
Attorney, Agent, or Firm—Lowe, Price, LeBlanc & Becker

[57] ABSTRACT

A neutral network representing apparatus includes a plurality of neuron expressing units and a plurality of synapse load expressing units. Each of the synapse load expressing units couples two neuron expressing units through a synapse load which is specific thereto. The synapse load of the synapse load expressing unit is adjusted in accordance with a prescribed learning rule in learning of the neural network representing apparatus. This learning rule includes a learning coefficient which defines the amount of a synapse load to be changed in a single learning cycle. This learning coefficient is set according to a spatial or physical distance between two neurons expressed by two neuron expressing units which are coupled by a synapse load expressing unit. The learning coefficient is provided by a monotone decreasing function of the distance between the two neurons.

10 Claims, 13 Drawing Sheets

TERMINAL D OR I

NODE N322 OR N323

NEURAL NETWORK REPRESENTING APPARATUS HAVING SELF-ORGANIZING FUNCTION

BACKGROUND OF THE INVENTION

1. Field of the Invention

The present invention relates to a neural network representing apparatus, and more particularly, it relates to a neural network representing apparatus having a self-organizing function. More specifically, the present invention relates to a synapse load correction scheme in self organization of a neural network representing apparatus.

2. Description of the Background Art

Neural networks have been widely implemented by various electronic circuits on the model of vital cells. Such a neural network representing apparatus has a self-organizing function, i.e., a learning function of correcting internal synapse load values in accordance with externally supplied educator information. "A Neuromorphic VLSI Learning System" by J. Alspector et al., in "Advanced Research in VLSI 1987", issued by MIT Press, pp. 313 to 327 discloses an exemplary neural network representing apparatus. The structure and operation of such a conventional neural network representing apparatus are now described.

FIG. 1 shows the structure of an integrated neural network which is disclosed in the above literature. Referring to FIG. 1, the conventional neural network includes complementary data input line pairs IN1 and $\overline{IN1}$ to INj and $\overline{INj}$, which are arrayed in the row direction and complementary data output line pairs S1 and $\overline{S1}$ to Sj and $\overline{Sj}$, which are arrayed in the column direction. This neural network further comprises differential amplifiers Zk which detect/amplify potential differences on the data input line pairs INk and $\overline{INk}$ (k=1 to j) and transfer the same onto the data output lines Sk and $\overline{Sk}$. Such differential amplifiers Z1 to Zj are arranged on a diagonal line of a connection matrix (matrix formed by the data input lines, the data output lines and resistive elements).

The respective differential amplifiers Zk (k=1 to j) correspond to neurons, while the data input lines IN and $\overline{IN}$ correspond to dendrites, and the data output lines S and $\overline{S}$ correspond to axons. In the following description, symbols IN and S generically denote the data input lines and the data output lines respectively. Synapse loads W are provided by resistive elements R which are arranged on crossings between the data input lines IN and $\overline{IN}$ and the data output lines S and $\overline{S}$.

The differential amplifier Zk has complementary outputs S and $\overline{S}$. When the neuron is in an "ON state", the output of the differential amplifier Zk goes to "1" (5 V), while the output S goes to "0" (0 V) when the same is in an OFF state. The outputs of such differential amplifiers Zk are fed back to the data input lines IN and $\overline{IN}$ through resistive elements R, which are arranged in a matrix to represent synapse loads.

A resistive element R which is arranged on an i-th row on a j-th column of the connection matrix connects the output of the differential amplifier (neuron) Zj to the input of the differential amplifier (neuron) Zi. When a synapse load Wij is positive, the data output line Sj is connected to the data input line INi and the complementary data output line $\overline{Sj}$ is connected to the complementary data input line $\overline{INi}$. When a synapse load Wij is negative, the complementary data output line $\overline{Sj}$ is connected to the data input line INi, and the data output line Sj is connected to the complementary data input line $\overline{INi}$.

A differential amplifier Zt which is provided in a region V of the connection matrix is regularly in an "ON state", and an output line Sv is regularly supplied with a signal of "1" and a complementary output line $\overline{Sv}$ is regularly supplied with a signal of "0". Such a differential amplifier Zt serves to eliminate influences by threshold values in the respective neuron units, thereby equivalently setting the threshold values of the respective neuron units at zero.

This neural network is initialized by setting the weight (resistance value) of each resistive element R. Data of the synapse load Wij can be transferred along bold arrows shown in FIG. 1 through a weight processing circuit which is provided in correspondence to each resistive element R, as hereinafter described.

FIG. 2 shows the structure of each synapse load block (resistive element). The synapse load block includes four transistor groups TR1, TR2, TR3 and TR4, in order to provide positive coupling (excitatory coupling) and negative coupling (inhibitory coupling). Each of the transistor groups TR1 to TR4, which are identical in structure to each other, includes n MIS (metal-insulating film-semiconductor) transistors T0 to Tn−1 and one pass transistor TG. ON-resistances of the MIS transistors T0 to Tn−1 are set at $1:2:\ldots:2^{n-1}$, in order to provide different resistance values.

The pass transistors TG1 and TG4 receive a signal TSGN showing the sign of the synapse value in the gates thereof, while the pass transistors TG2 and TG3 receive a complementary signal $\overline{TSGN}$ at the gates thereof. The signals TSGN and $\overline{TSGN}$ are complementary to each other, and positiveness/negativeness of the sign of the synapse load is determined by the signals. When the synapse load Wij is positive, the signal TSGN goes to "1", and the synapse load Wij is provided by the transistor groups TR1 and TR4. When the synapse load Wij is negative, the complementary signal $\overline{TSGN}$ goes to "1", and the synapse load Wij is provided by the transistor groups TR2 and TR3.

The synapse load Wij is set by bringing one or more MIS transistors in each transistor group TR into ON states by an output from a weight processing circuit. The structure and operation of the weight processing circuit for setting the synapse load are now described.

FIG. 3 illustrates the structure of the weight processing circuit for correcting the synapse load in self organization. This weight processing circuit is provided for each synapse load Wij, and includes a correlation logic CL, an up/down logic UDL, and flip-flops FF0 to FFn.

The flip-flops FF0 to FFn control ON/OFF states of the MIS transistors for representing the corresponding synapse load Wij. The flip-flop FF0 stores information indicating the sign of the synapse load Wij, and controls ON/OFF operations of the pass transistors TG. The flip-flops FF0 to FFn control ON/OFF states of the MIS transistors T0 to Tn−1 (see FIG. 2).

The correlation logic CL receives a signal "Phase" indicating the phase in the operation and a signal "COOC" indicating the times when both outputs Si and Sj of the neuron units (differential amplifiers) Zi and Zj are "1", and counts the number thereof, thereby evaluating a probability distribution (expected value) Pij. This correlation logic CL receives a weight adjusting signal ADW and supplies a signal indicating an increment, a decrement or holding (silent state) to the up-/down logic UDL, in accordance with the following equation through the evaluated probability distribution Pij:

$$\Delta Wij = \eta \cdot (P^+ ij - P^- ij)$$

where $\eta$ represents a positive constant called a learning coefficient, which defines the amount of correction of the synapse load in a single learning operation. Signs + and − added to Pij indicate that these are probability distributions which are obtained in plus and minus phases respectively. In the plus phase, input neurons and output neurons are champed to educator information data (data pattern to be learned). In the minus phase, only the input neurons are clamped at the educator information.

The up/down logic UDL increments, decrements or holds its count value in response to an increment/decrement instruction signal received from the correlation logic CL, and transfers the same to the flip-flops FF0 to FFn. The up/down logic UDL, having the structure of a shift register, can receive a synapse load W from an up/down logic which is included in an adjacent weight processing circuit and transfer the data to another up-/down logic which is included in an adjacent subsequent stage in initialization.

FIG. 4 illustrates an exemplary structure of the up-/down logic UDL. In the structure shown in FIG. 4, each synapse load W is displayed in four bits (including one sign bit), for example. FIG. 4 illustrates no path for setting weight data from an adjacent weight processing circuit shown in FIG. 3.

The up/down logic UDL is formed by an up/down counter 100. The up/down counter 100 comprises a terminal U/D which receives a signal instructing increment/decrement of a count value, a terminal T which receives a signal providing a change timing for the count value, a reset terminal R, and data output terminals Q0 to Q3. Outputs from the output terminals Q0 to Q2 provide the value of the synapse load W, while the output terminal Q3 outputs data defining the sign of the synapse load W. The output data from the output terminal Q3 is transferred through an inverter I1. The output terminals Q0 to Q3 are coupled to flip-flops FF0 to FFn (n=3) through signal lines 103 to 106.

In accordance with an increment/decrement instruction signal transferred through a signal line 102, the up/down counter 100 increments, decrements or holds its count value in response to a timing signal which is transferred through a signal line 101. Learning of the synapse load is made by this operation.

A threshold processing operation of one neuron (differential amplifier) Zi is now described with reference to FIG. 5. First, the structure of the differential amplifier Zi is described.

Referring to FIG. 5, the differential amplifier (neuron i) Zi comprises two pairs of differential inputs and a pair of differential outputs. The first differential input pair differentially amplifies the potential difference on data input lines IN and $\overline{IN}$, and provides an energy gap $$\Delta Ek \left( = \sum_j Wkj \cdot Sj \right).$$

The second differential input pair receives a complementary output from a differential amplifier AZ for generating noises, and generates an annealing temperature T in the form of a noise.

The amplifier AZ receives a noise signal from a noise source NS. The noise signal from the amplifier AZ is so set that its level is reduced with progress of a certain phase. Thus, implemented is such a process that annealing is started at a high temperature level and the annealing temperature is successively reduced so that the neural network is stabilized at the global minimum without capture in pseudo optimum solutions (local minima). The amplifier AZ is generally formed by an operational amplifier, whose gain is adjusted from an externally provided device in order to set the annealing temperature.

The threshold processing operation of the differential amplifier Zi is now described.

Referring to FIG. 5, one transistor TC represents the conductance of each synapse load W. When a synapse load W is positive and a neuron corresponding thereto is in an "ON state" (differential amplifier output S is "1") or the synapse load W is negative and the neuron related thereto is in an "OFF state", voltages Von and Voff are transferred to the data input lines IN and $\overline{IN}$ through conductances of I and IV rows. Conductances of the II and III rows are those in such a case that the synapse load W is negative and the neuron is in an "ON state" or the synapse load W is positive and the neuron is in an "OFF state". In this case, the voltage Voff is transferred to the data input line IN, and the voltage Von is transferred to the complementary data input line $\overline{IN}$.

The positive input of the differential amplifier Zi is coupled with a conductance for pulling up the same to the voltage Von and that for pulling down the same to the voltage Voff. The conductance for pulling up the positive input of the differential amplifier Zi to the voltage Von is provided by the absolute value of the sum of positive synapse loads from "ON state" neurons and negative synapse loads W from "OFF state" neurons. The conductance for pulling down the potential of the positive input of the differential amplifier Zi to the voltage Voff is provided by the absolute value of the total sum of negative synapse loads from "ON state" neurons and positive synapse loads W from "OFF state" neurons. Relation of the conductances at the negative input of the differential amplifier Zi is inverse to that at the positive input of the differential amplifier Zi.

Considering the aforementioned relation as well as the fact that the synapse load in the region V shown in FIG. 1 is expressed as $-\theta i$, the differential amplifier Zi simply performs the following comparison:

$$\sum_j Wij \cdot Sj^* > \theta i$$

where
   $Sj^* = 1 : Sj = 1$
   $Sj^* = -1 : Sj = 0$

The differential amplifier Zi performs threshold processing in accordance with the aforementioned expression, and outputs data (state signals) to data output lines S and $\overline{S}$.

In this structure, the value of the positive input of the differential amplifier Zi may be simply compared with a threshold value (Von+Voff)/2, thereby obtaining desired output data.

There has also been proposed a structure of a synapse load expressing circuit which stores information indicating a synapse load in a register and transfers a current from a constant current source onto a dendrite signal line in response to "1" or "0" of a signal Sj on an axon signal line and the information stored in the register. An exemplary structure using the constant current source is described in pages 10.1.1 to 10.1.7 of an article entitled "Electronic Circuit Implementation of Neuron Morphic System" by Jack I. Ruffel, IEEE 1988 "Custom Integrated Circuit Conference". Also in this synapse load expressing circuit, conductance ratios of MIS transistors are so adjusted as to transfer a desired product signal Wij·Sj onto the dendrite signal line.

In a conventional neural network representing apparatus, synapse loads are corrected in accordance with the following expression:

$$\Delta Wij = \eta \cdot (p^+ ij - p^- ij)$$

The synapse load correction coefficient (learning coefficient) $\eta$ is a positive constant, which is set at a common value to all synapse load expressing circuits. This means that overall neurons are identical in self-organizing efficiency to each other, which is equivalent to such interpretation that an influence exerted by a remote neuron to a certain neuron is identical to that exerted by a neuron which is close to this neuron.

In the vital brain, it may be predicted that interaction between neurons is reduced as the distance therebetween is increased, due to increase in propagation time of an axon signal and attenuation of the signal in propagation. In other words, it can be said that correction of synapse loads is greatly influenced by spatial positional relations, such as interdistances, between related neurons.

Thus, the self-organizing model of the conventional neural network device is too much simplified, and it has been impossible to perform self organization precisely reflecting the function of the vital brain, i.e., the learning process of an organism.

SUMMARY OF THE INVENTION

An object of the present invention is to provide a neural network representing apparatus having an improved self-organizing model, which overcomes the disadvantages of the conventional neural network representing apparatus.

Another object of the present invention is to provide a neural network representing apparatus which can perform self organization more precisely reflecting the function of the vital brain.

Still another object of the present invention is to provide a neural network representing apparatus which can perform self organization in consideration of spatial positional information of neurons.

The neural network of the present invention representing apparatus having a self-organizing function has a synapse load correction coefficient $\eta$, which defines the amount of a synapse load corrected by a single learning operation, set in accordance with a spatial distance between neurons which are coupled by a synapse expressing unit.

The synapse load correction coefficient $\eta$ is preferably set as a monotone decreasing function of a spatial distance between neuron expressing units which are coupled by a synapse expressing unit.

According to the present invention, the synapse load correction coefficient (learning coefficient) in the synapse expressing unit is set according to the distance between the neuron expressing units which are coupled by the synapse expressing unit, whereby it is possible to perform self organization in consideration of spatial positions of respective neurons as well as to implement a neural network representing apparatus which performs self organization more precisely reflecting the function of the actual vital brain.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 6:
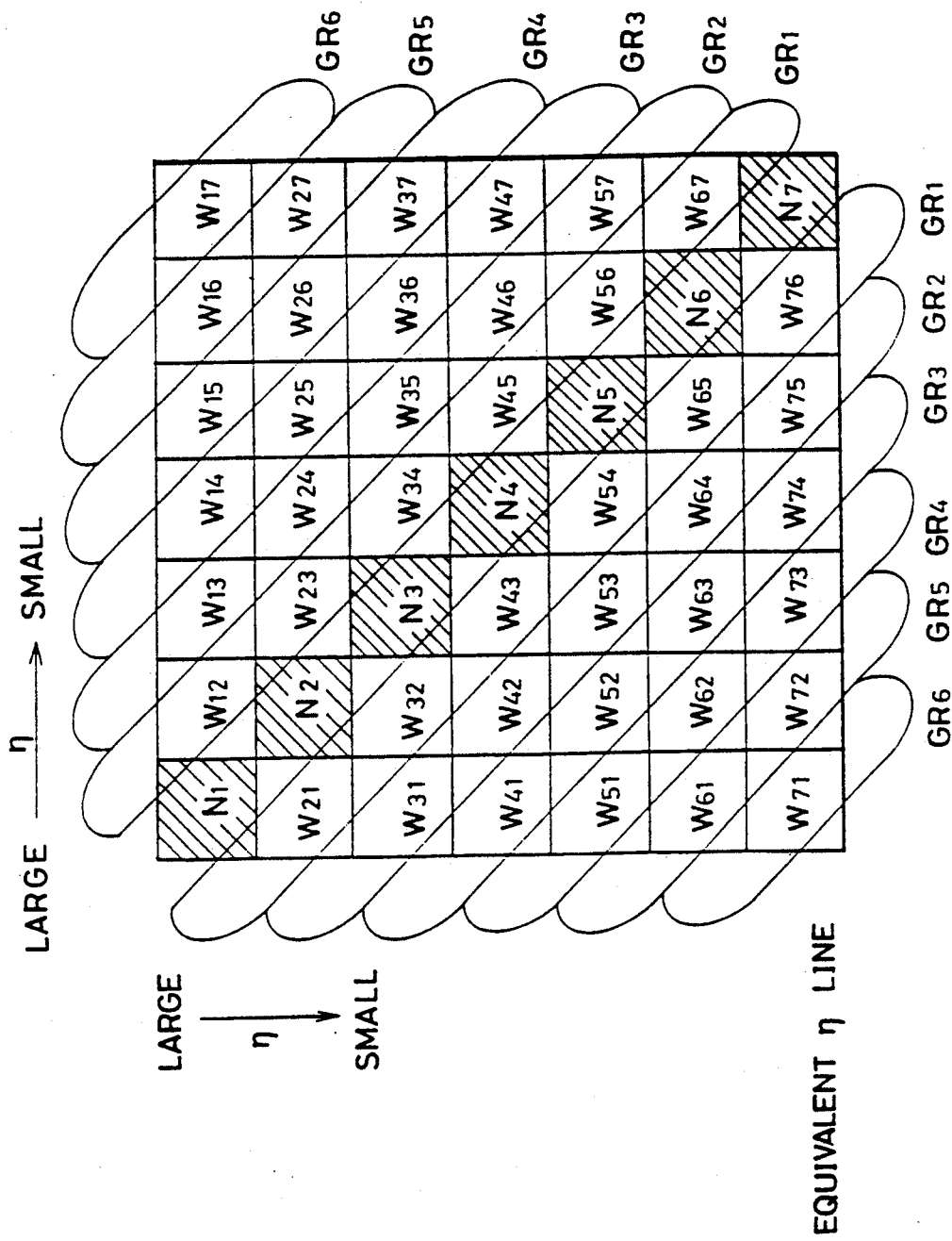
FIG. 6 illustrates a conceptual structure of a neural network representing apparatus according to the present invention.

FIG. 6 shows a conceptual structure of a neural network representing apparatus having a self-organizing function according to the present invention. Referring to FIG. 6, the neural network representing apparatus includes seven neuron expressing units N1 to N7 which are arranged on a diagonal line, and synapse expressing units W12 to W76 which connect the neuron expressing units through specific connection strengths. In this neural network, all neurons are connected with each other through synapses. In order to simplify the illustration, connection paths corresponding to dendrite signal lines and axon signal lines are omitted.

Consider a case of making correspondence between spatial positional data carried by neurons in a neural network represented by this neural network representing apparatus and physical positions on a semiconductor chip or a printed circuit board on which the neuron expressing units are arranged in practice. For example, the neuron N3 is adjacent to the neurons N2 and N4, and separated farthest from the neuron N7. In the following description, neurons indicate those in a certain neural network model, and units of the neural network representing apparatus corresponding to the neurons are explained as neuron expressing units.

A relative position (distance) between two neurons which are interconnected by a certain synapse Wij (in the following description, a synapse expressing unit and a synapse load expressed by the unit are denoted by the same symbol) corresponds to the length of a perpendicular extended from the position of the synapse expressing unit to the diagonal line on which the neuron expressing units N1 to N7 are arranged. If the synapse expressing units and the neuron expressing units are arrayed in the form of a square matrix as shown in FIG. 6, the distance between two neurons is twice the length of a perpendicular extended from the synapse expressing unit connecting the two neurons to the diagonal line. Referring to FIG. 6, each group GRi encircled by an equal η line shown by an ellipse means that distances between pairs of neurons interconnected by synapses contained in the group are equal to each other. In the arrangement structure shown in FIG. 6, therefore, the synapse expressing units placed remotely from the diagonal line connect remote neurons.

In the vital brain, the degrees of interactions between neurons are reduced or influences by such interactions are delayed as the distances between the neurons are increased. In other words, it may be predicted that the degrees of interactions between remote neurons are reduced with respect to the same time duration in self organization. According to the present invention, therefore, the synapse load correction coefficient η in each synapse expressing unit is set to monotonously decrease along the distance from the diagonal line, as shown in FIG. 6. Thus, it is possible to implement a neural network representing apparatus having a self-organizing function which imitates better the self organization of the vital brain. As to functions expressing the relation between the synapse load correction coefficient η and a distance r between neurons, the following monotone decreasing functions, error functions or the like are available:

$$\eta = K/(r+r_0)$$

$$\eta = (r_0 - r) \cdot K$$

$$\eta = K \cdot exp(-r^2/r_0^2)$$

where r represents the distance between the interconnected neurons, while K and $r_0$ represent positive constants.

Figure 1:
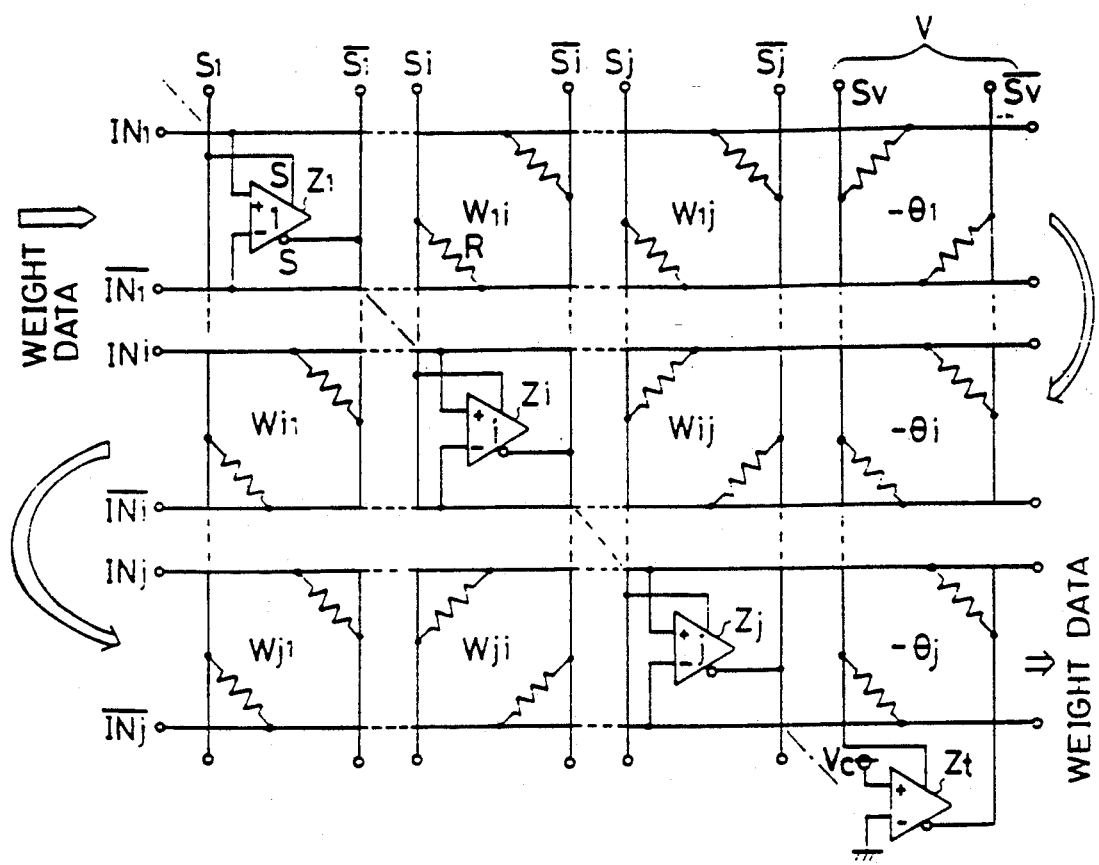
FIG. 1 illustrates an example of a conventional neural network representing apparatus having a self-organizing function.
Figure 2:
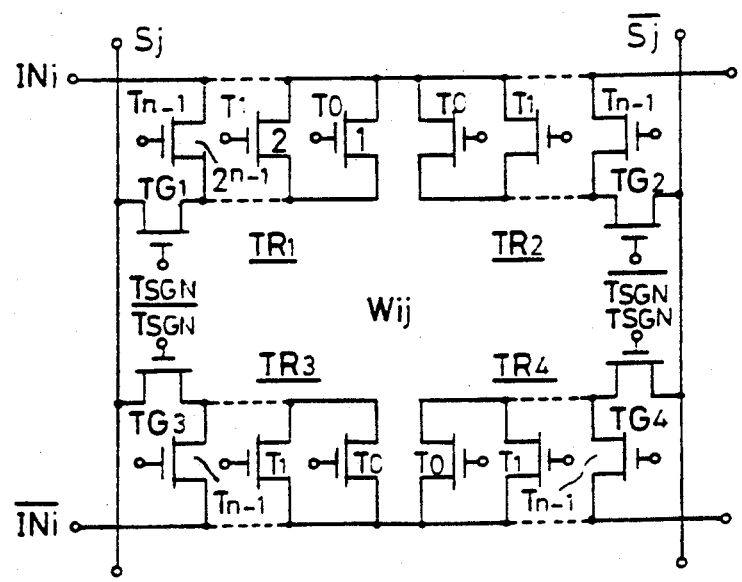
FIG. 2 illustrates an exemplary specific structure of a synapse expressing block shown in FIG. 1.
Figure 3:
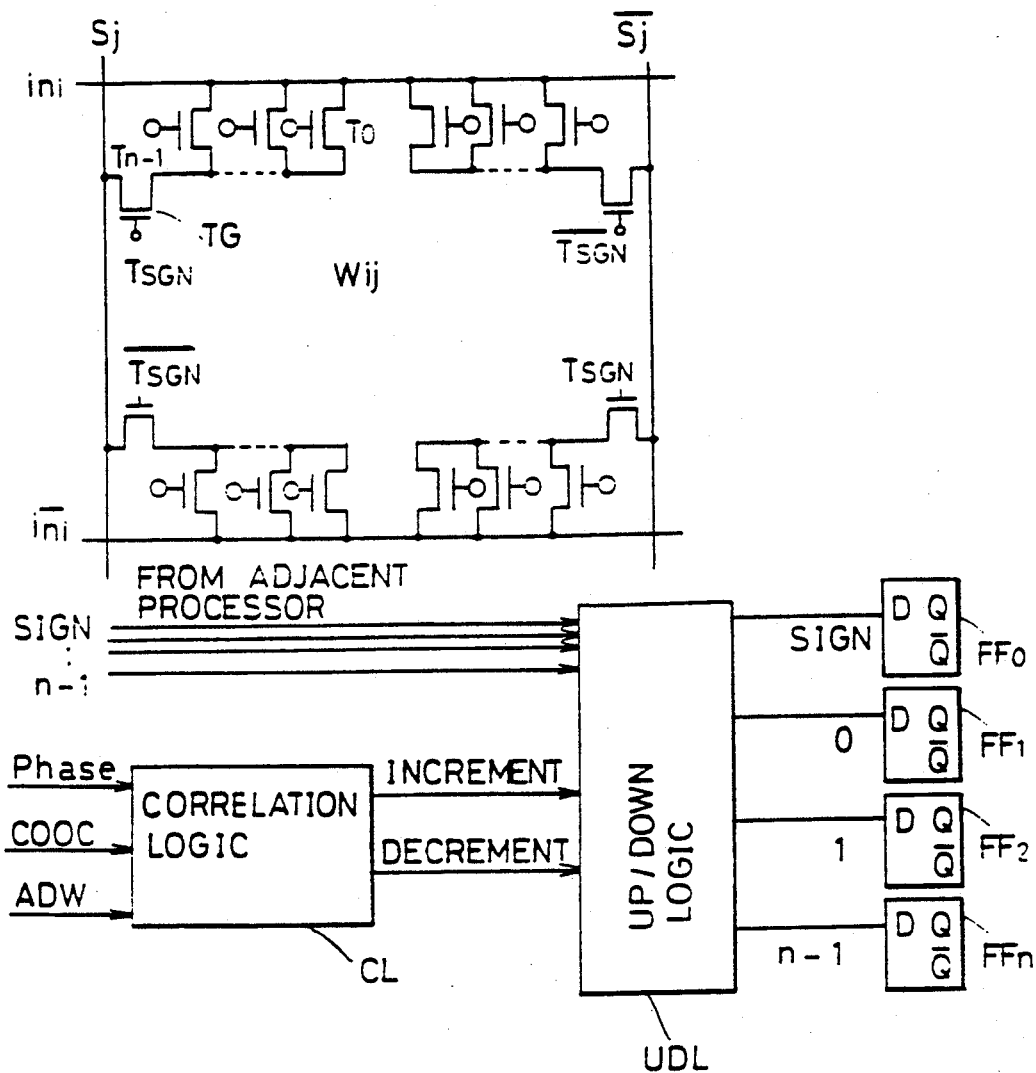
FIG. 3 illustrates an exemplary structure of a weight processing circuit for synapse load correction shown in FIG. 2.
Figure 4:
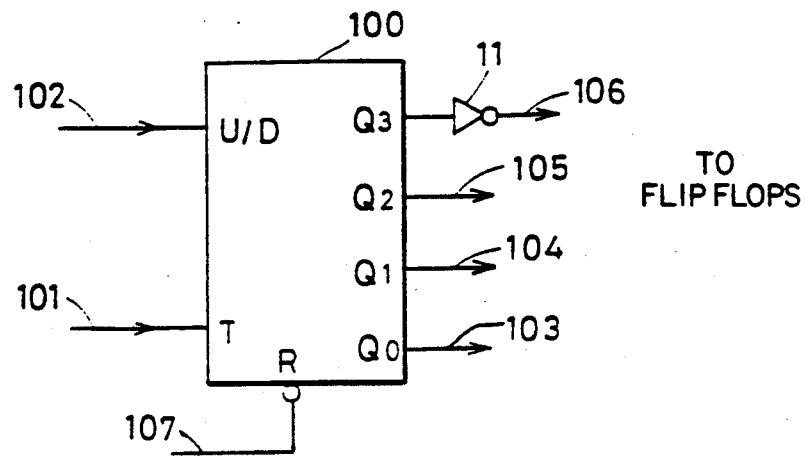
FIG. 4 illustrates an exemplary structure of an up-/down logic shown in FIG. 3.
Figure 5:
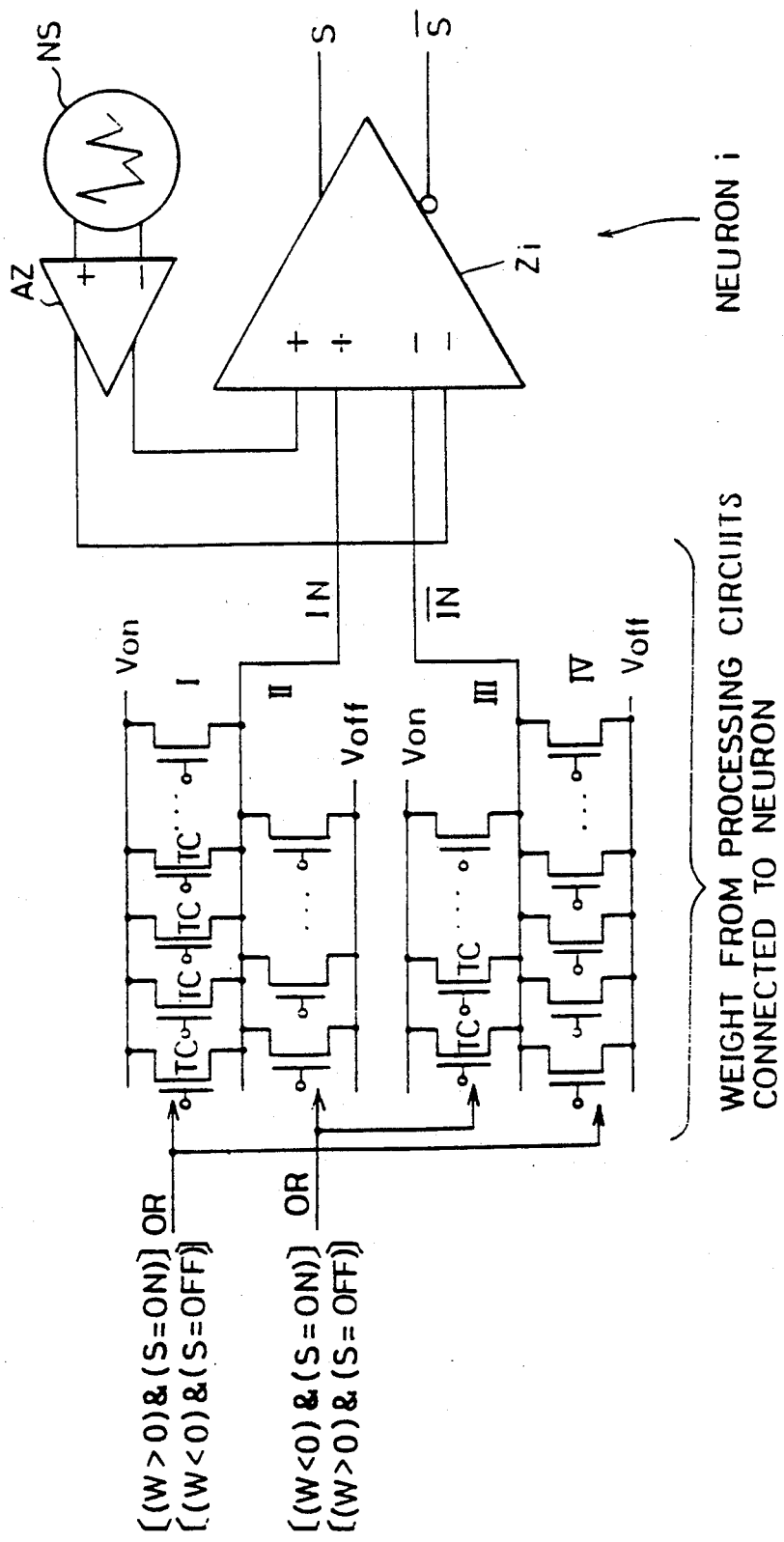
FIG. 5 is a diagram for illustrating the operation of one neuron unit in the neural network representing apparatus shown in FIG. 1.
Figure 7:
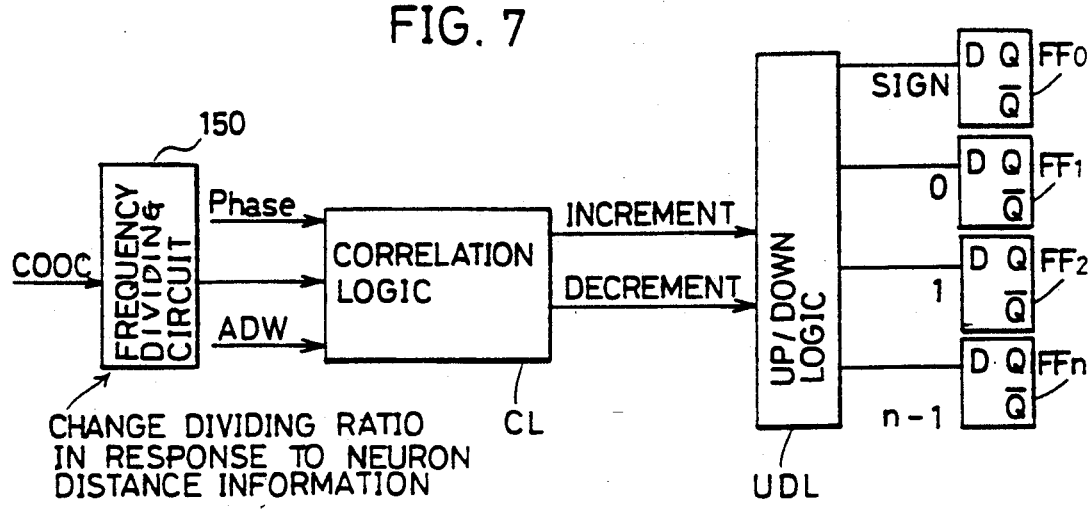
FIG. 7 schematically illustrates the structure of a synapse load correction circuit (weight processing circuit) employed in a neural network representing apparatus according to an embodiment of the present invention.

FIG. 7 shows an exemplary structure for implementing a self-organizing function according to an embodiment of the present invention. This structure provides an improvement to the conventional weight processing circuit shown in FIG. 3. Referring to FIG. 7, a frequency dividing circuit 150 is provided on a preceding stage of a COOC input terminal of the correlation logic CL which is included in the weight processing circuit. The frequency dividing ratio of the frequency dividing circuit 150 is set in response to the distance between neurons to which the synapse expressing unit is related. This frequency dividing circuit 150 divides in frequency a signal COOC in accordance with the set frequency dividing ratio and outputs the same. When the frequency dividing ratio is 2, for example, the frequency dividing circuit 150 generates a pulse signal every time the signal COOC is supplied twice. The frequency dividing circuit 150 can be easily implemented through a counter circuit which generates a pulse signal every time its count value reaches a prescribed value.

Figure 8:
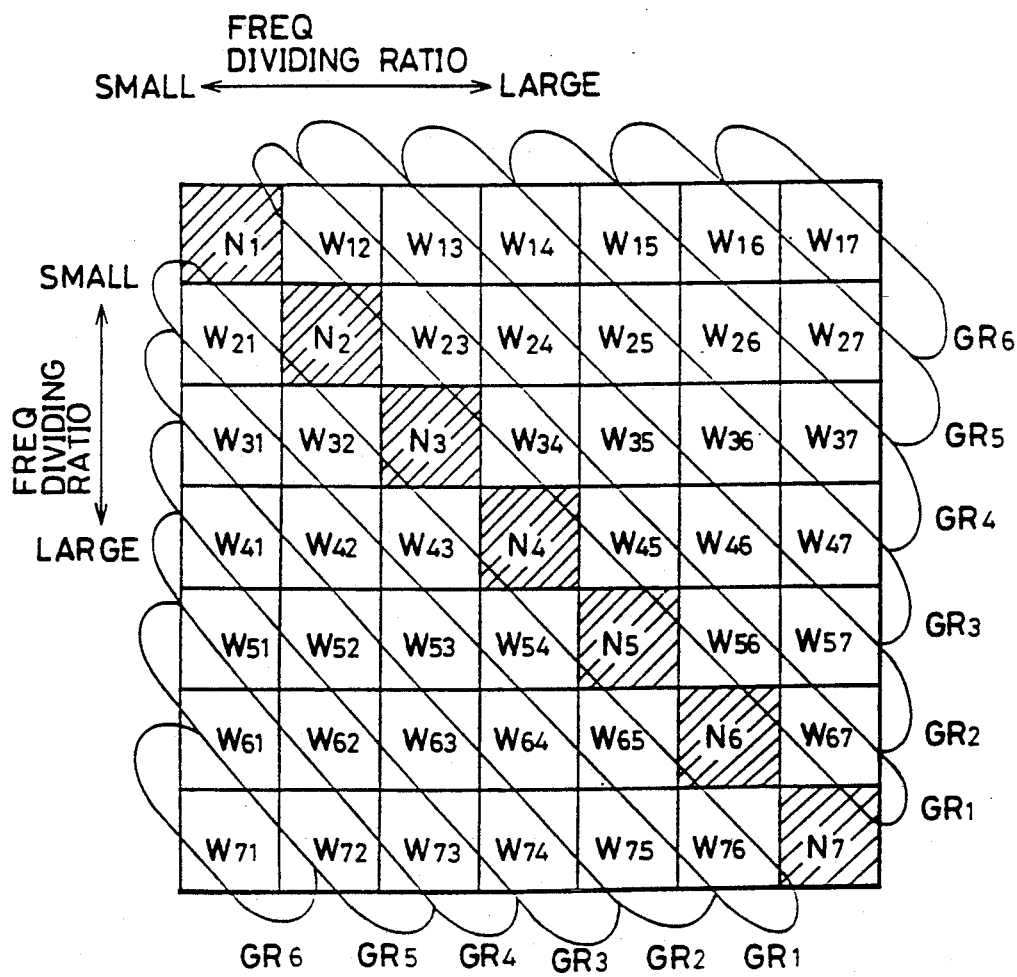
FIG. 8 illustrates the distribution of frequency dividing ratios in the neural network representing apparatus which is formed by the synapse load correction circuit shown in FIG. 7.

As shown in FIG. 8, frequency dividing ratios of such frequency dividing circuits 150 shown in FIG. 7 are set in correspondence to distances between interconnected neurons, to be reduced as the related synapse expressing units approach the diagonal line, and to be increased as the synapse expressing units are spaced away from the diagonal line. In other words, the frequency dividing ratios in the synapse expressing units are successively increased from the groups GR1 to GR6, as shown in FIG. 8.

According to this structure, the amounts of synapse load correction are reduced in synapse expressing units which are more remote from the position of the diagonal line shown in FIG. 8, while those of the synapse expressing units included in the group closer to the diagonal line are increased in a single learning operation. This means that learning between spatially far away neurons progresses slowly and that between closer neurons progresses quickly, whereby it is possible to obtain behavior which imitates better the self organization of a neural network in the actual vital brain.

Figure 9:
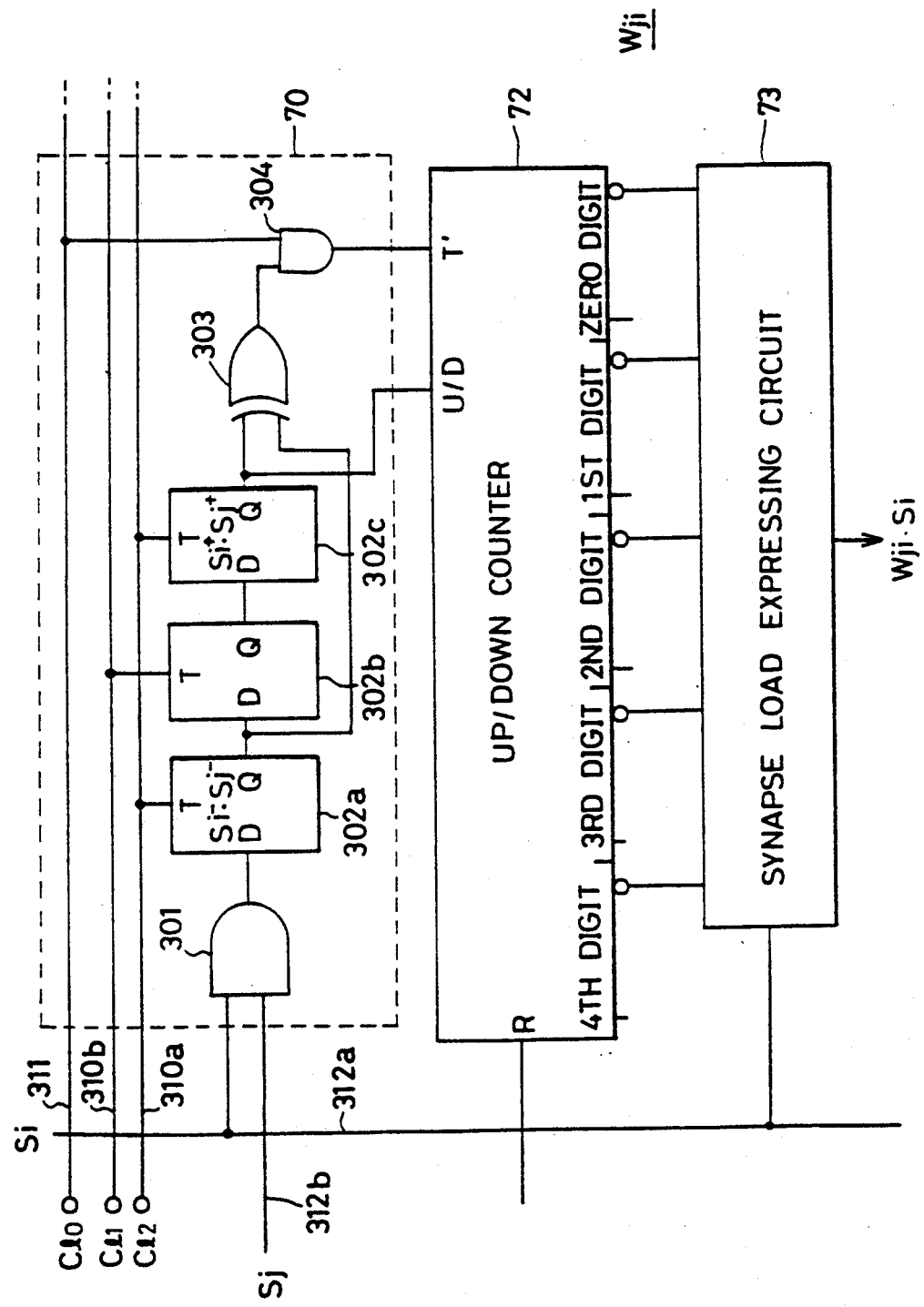
FIG. 9 illustrates the structure of a synapse expressing unit according to another embodiment of the present invention.

FIG. 9 shows an exemplary structure of a synapse load expressing unit according to another embodiment of the present invention. The structure shown in FIG. 9 corresponds to each synapse expressing unit Wji shown in FIG. 6. Referring to FIG. 9, the synapse expressing unit Wji includes a learning control circuit 70 which generates synapse load value correction information in accordance with a prescribed learning rule in a learning mode, an up/down counter 72 which corrects and holds the synapse load value in response to the correction information received from the learning control circuit 70, and a synapse load expressing circuit 73 which calculates the product of the synapse load value received from the up/down counter 72 and a state signal Si (output from a neuron expressing unit Ni) on a signal line 312a to derive Wji·Si.

The learning control circuit 70 includes AND gates 301 and 304, D-latches 302a, 302b and 302c, and an unequality detection circuit (EXOR gate) 303. The AND gate 301 receives state signals Si and Sj from signal lines 312a and 312b. The D-latch 302a has a D-input which receives the output of the AND gate 301, a clock input T which receives a clock signal Cl2 transferred through the signal line 310a, and a Q-output. The D-latch 302b has a D-input which receives the Q-output of the D-latch 302a, a clock input terminal T which receives a clock signal Cl1 transferred through the signal line 310b, and a Q-output. The D-latch 302c has a D-input which receives the Q-output of the D-latch 302b, a clock input terminal T which receives the clock signal Cl2 transferred through the signal line 310a, and a Q-output.

The unequality detection circuit 303 receives the Q-outputs of the D-latches 302a and 302b. The AND gate 304 receives the output of the unequality detection circuit 303 and a clock signal Cl0 transferred through the signal line 311.

The Q-output of the D-latch 302c is supplied to an up/down input terminal U/D of the updown counter 72. The output of the AND gate 304 is coupled to a clock input terminal T' of the updown counter 72.

The clock signals Cl0, Cl1 and Cl2 are externally supplied control signals. The clock signal Cl0 provides a count instruction at the counter 72. The clock signals Cl1 and Cl2 are two-phase non-overlapping clock signals, which provide latch timings at the D-latches 302a to 302c. Each of the D-latches 302a to 302c has a function of latching and outputting data. The operation is now described.

The AND gate 301 receives the state signals Si and Sj through the signal lines 312a and 312b. The logical product of the state signals Si and Sj is transferred to the D-input of the D-latch 302a.

In plus phase of the learning mode, the states of input and output neurons are fixed in correspondence to externally supplied educator information (patterns to be learned). After simulated annealing is performed in this state, the clock signal Cl2 is supplied onto the signal line 310a under such a state that the state signals Si and Sj supplied onto the signal lines 312a and 312b are developed. In response to this, the output of the AND gate 301 is latched by the D-latch 302a. Namely, the D-gate latch 302 latches the product $S^+i \cdot S^+j$ of the state signals Si and Sj of neurons i and j in the plus phase.

Then, the operation of the minus phase is performed. First, only input neurons are clamped at a value corresponding to the educator information. At this time, the output neurons are brought into free states. Simulated annealing is performed in this state. After the values of the state signals Si and Sj on the signal lines 312a and 312b are developed, the clock signal Cl1 is supplied onto the signal line 310b to shift the data of the D-latch 302a to the D-latch 302b, and thereafter the clock signal Cl2 is supplied onto the signal line 310a. Thus, the D-latch 302c latches the product $S^+i \cdot S^+j$ of the state signals in the plus phase, and the D-latch 302a latches a product $S^-i \cdot S^-j$ of the state signals in the minus phase.

The unequality detection circuit 302 receives the Q output of the D-latch 302a and the Q-output of the D-latch 302c. Thus, the output of the unequality detection circuit 303 goes low when the products $S^+i \cdot S^+j$ and $S^-i \cdot S^-j$ of the state signals equal with each other. Otherwise it goes high.

The AND gate 304 receives the output of the unequality detection circuit 303 at its first input. Therefore, only when the products $S^+i \cdot S^+j$ and $S^-i \cdot S^-j$ are not equal to each other, the AND gate 304 passes the clock signal Cl0 supplied through the signal line 311 and transfers the same to the clock input terminal T' of the up/down counter 72. In response to the data value of the state signal product $S^+i \cdot S^+j$ latched in the D-latch 302c, the counter 72 increments or decrements its count value by the number of times when the clock signal Cl0 is supplied. Namely, the counter 72 increments its count value when the signal received in its up/down instruction input U/D is at a high level, and decrements the count value when the signal is at a low level. Thus, the learning rule for the synapse load Wij in the structure shown in FIG. 9 is expressed as follows:

$$\Delta Wij = \eta \cdot (S^+i \cdot S^+j - S^-i \cdot S^-j)$$

This synapse load correction coefficient (learning coefficient) $\eta$ is expressed by the number of the clock signals Cl0 supplied to the clock signal line 311.

Therefore, when the clock signal Cl0 is so adjusted that the synapse load correction coefficients $\eta$ in the respective synapse expressing units are varied with the synapse expressing unit groups as shown in FIG. 6, it is possible to set the synapse load correction coefficients in the synapse expressing units in accordance with the distances between the neurons interconnected by the synapse expressing units.

Figure 10:
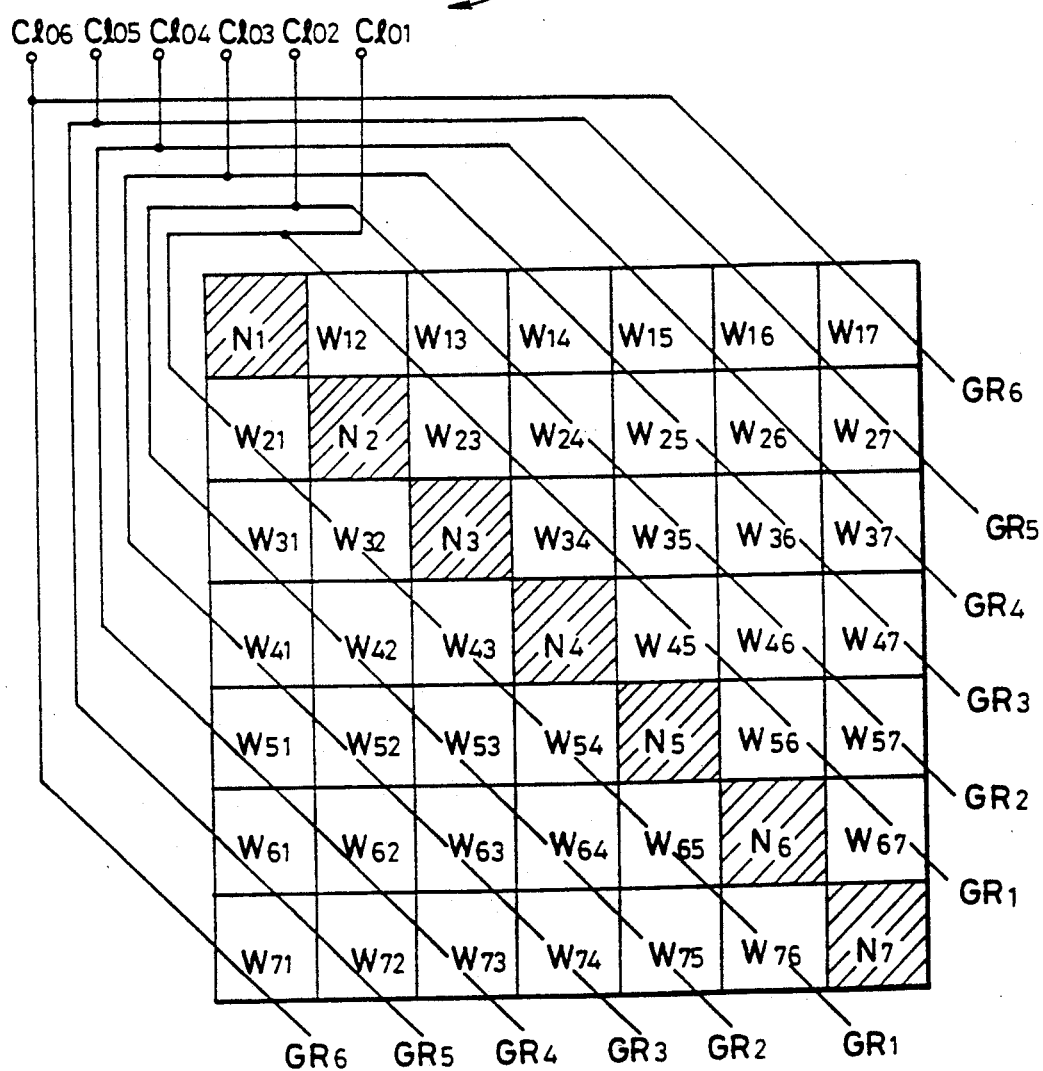
FIG. 10 typically illustrates a mode of connection of control clock signal lines for setting a synapse load correction coefficient in a neural network representing apparatus employing the synapse load expressing unit shown in FIG. 9.

FIG. 10 shows a method of setting synapse load correction coefficients $\eta$ in employment of such synapse expressing units as shown in FIG. 9. As shown in FIG. 10, common Cl0 input terminals may be provided for synapse expressing units located on line segments which are parallel to the diagonal line on which neuron expressing units N1 to N7 are arranged to distribute clock signals Cl01 to Cl06 to the respective groups, thereby increasing frequency dividing ratios of the clock signals Cl01 to Cl06 (cycles of supplied signals) as the clock signal lines are remote from the diagonal line, i.e., in order of the clock signals Cl01 to Cl06.

By the aforementioned structure, the values of the synapse load correction coefficients $\eta$ (count values of the clock signals Cl0) are reduced as the distances between the interconnected neurons are increased, whereby it is possible to implement learning which is approximate to self organization in the vital brain.

Figure 11:
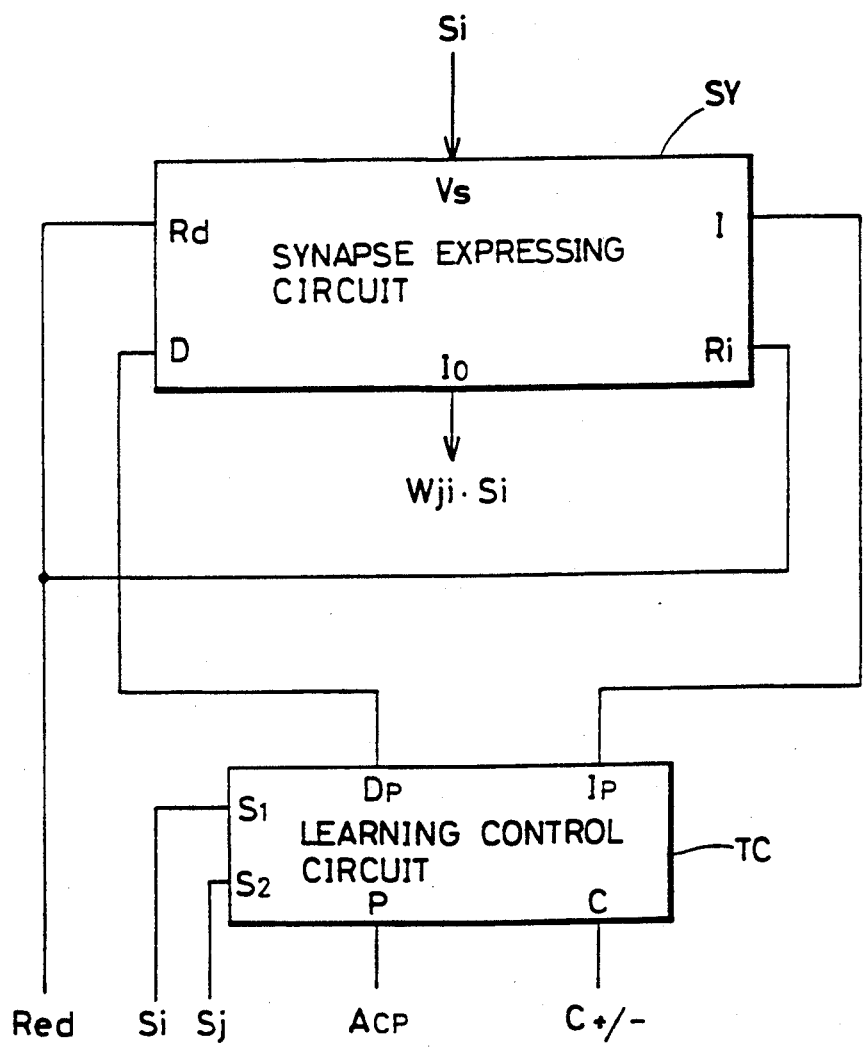
FIG. 11 schematically illustrates the structure of a synapse expressing unit according to still another embodiment of the present invention.

FIG. 11 shows the overall structure of a synapse expressing unit according to still another embodiment of the present invention. Referring to FIG. 11, the synapse expressing unit comprises a synapse expressing circuit SY which receives a state signal Si, weighs it by a synapse load Wij and outputs the result, and a learning control circuit TC which corrects the synapse load value in the synapse expressing circuit SY in accordance with a prescribed learning rule.

The learning control circuit TC includes a terminal $\overline{P}$ which receives a control signal Acp indicating execution/non execution of learning, a terminal C which receives a signal C+/− indicating a learning phase, a terminal Ip which generates a change amount control signal for an excitatory (positive coupling) synapse load value in a plus phase, a control terminal Dp which derives a change amount control signal for an inhibitory (negative coupling) synapse load value in a minus phase, and terminals S1 and S2 which receive state signals Si and Sj respectively.

The terminal Dp is connected to a D-input of the synapse load expressing circuit SY, and the terminal Ip is connected to an I-input terminal of the synapse expressing circuit SY.

A control signal Red for resetting the synapse load value is supplied to terminals Rd and Ri of the synapse expressing circuit SY.

Figure 12:
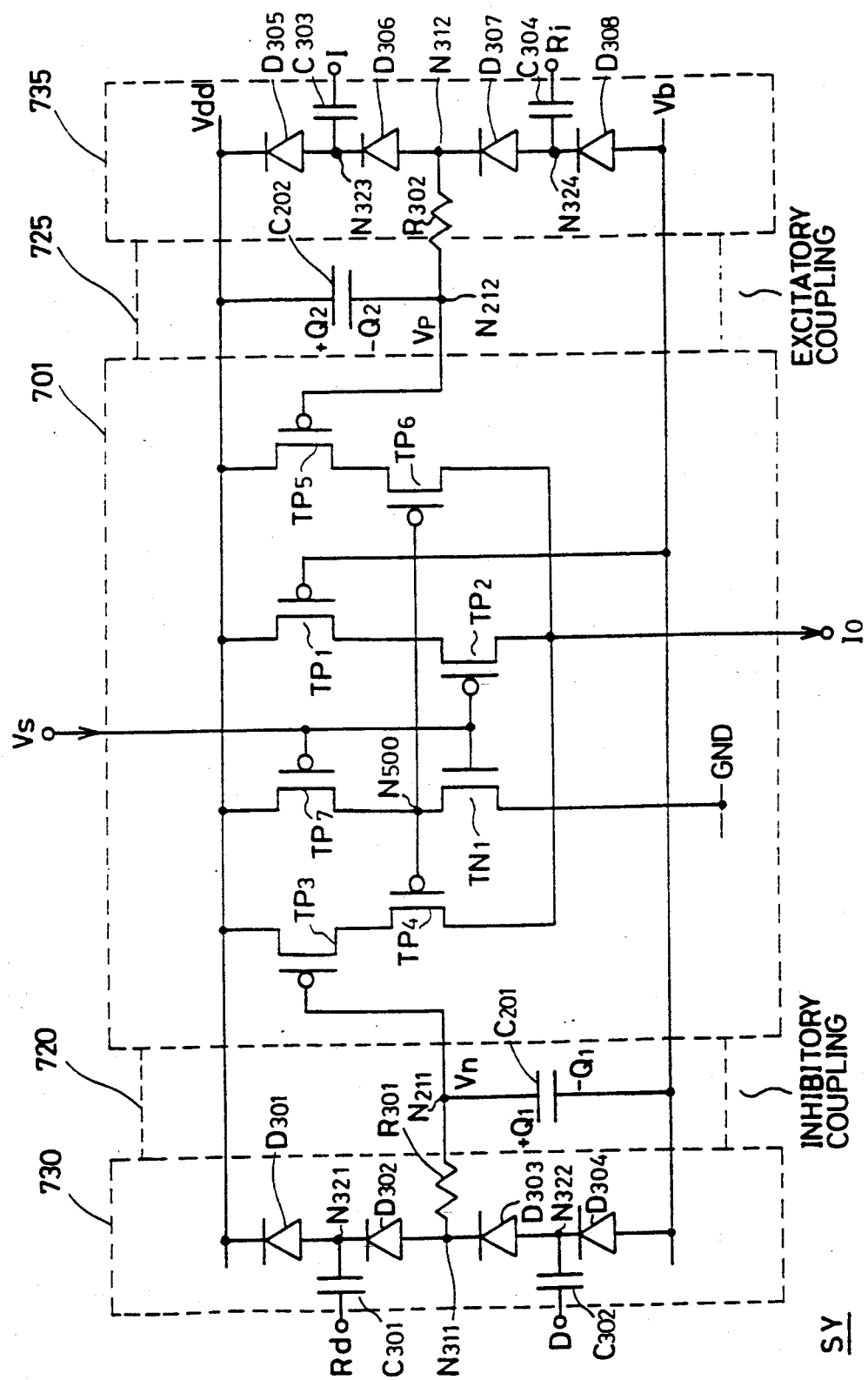
FIG. 12 illustrates an exemplary structure of the synapse expressing unit shown in FIG. 11.

FIG. 12 shows an exemplary structure of the synapse expressing circuit SY. Referring to FIG. 12, the synapse expressing circuit SY includes synapse load storing circuits 720 and 725 which store synapse load values, a synapse coupling expressing circuit 701 which weighs, by the synapse load stored in the synapse load storing circuit 720 or 725, a supplied axon signal (state signal voltage) Vs and transfers the same onto a dendrite signal line in the form of a current signal, and synapse load correction circuits 730 and 735 which correct the synapse load values stored in the synapse load storing circuits 720 and 725 in response to a pulse signal from the learning control circuit TC.

The synapse coupling expressing circuit 701 includes p-channel MIS transistors TP1 to TP7 and an n-channel MIS transistor TN1. The p-channel MIS transistors TP1 and TP2 provide a first current passing circuit and the p-channel MIS transistors TP3 and TP4 provide a second current passing circuit, while the p-channel MIS transistors TP5 and TP6 provide a third current passing circuit. The p-channel MIS transistor TP7 is complementarily connected with the n-channel MIS transistor TN1, to form a complementary inverter.

The p-channel MIS transistor TP1 has a source connected to a source voltage node Vdd, a gate connected to a bias voltage node Vb, and a drain connected to a source of the p-channel MIS transistor TP2. The p-channel MIS transistor TP2 has a gate coupled to a state signal input node Vs, and a drain connected to a synapse coupling current output node Io.

The p-channel MIS transistor TP3 has a source connected to the source voltage node Vdd, a gate coupled to an output of the synapse load storing circuit 720 storing an inhibitory synapse load value, and a drain connected to a source of the p-channel MIS transistor TP4. The p-channel MIS transistor TP4 has a gate connected to an output node N500 of the inverter (TP7 and TN1), and a drain connected to the synapse coupling current output node Io.

The p-channel MIS transistor TP5 has a source connected to the source voltage node Vdd, a gate coupled to an output of the synapse load storing circuit 725 storing an excitatory synapse load value, and a drain connected to a source of the p-channel MIS transistor TP6. The p-channel MIS transistor TP6 has a gate connected to the output node N500 of the inverter (TP7 and TN1), and a drain connected to the synapse coupling current output node Io.

The p-channel MIS transistor TP7 has a source connected to the source voltage node Vdd, a gate coupled to the state signal input node Vs, and a drain connected to a drain of the n-channel MIS transistor TN1. The n-channel MIS transistor TN1 has a gate coupled to the state signal input node Vs, and a source connected to a ground potential level VGND.

The p-channel MIS transistors defining the respective current passing circuits are identical in channel width and current supply capability to each other in the current passing circuits. In other words, the p-channel MIS transistors TP1, TP3 and TP5 are identical in channel width to each other, while the p-channel MIS transistors TP2, TP4 and TP6 are identical in channel width to each other.

The synapse load storing circuit 720 storing the inhibitory synapse load value is formed by a capacitor C201.

The capacitor C201 has a first electrode connected to a node N211, and a second electrode connected to the bias voltage node Vd. The first electrode of the capacitor C201 is connected to the gate of the p-channel MIS transistor TP3 through the node N211.

The synapse load storing circuit 725 storing the excitatory synapse load value is formed by a capacitor C202. The capacitor C202 has a first electrode connected to the source voltage node Vdd, and a second electrode connected to a node N212. The node N212 is connected to the gate of the p-channel MIS transistor TP5.

The synapse load correction circuit 730 corrects the synapse load value stored in the synapse load storing circuit 720 in response to the pulse signal from the learning control circuit TC. The synapse load correction circuit 730 includes diodes D301, D302, D303 and D304, capacitors C301 and C302, and a resistor R301.

The diodes D302 and D301 are serially connected between a node N311 and the source voltage node Vdd in a forward direction from the node N311. The diodes D303 and D304 are serially connected between the node N311 and the bias voltage node Vb in a reverse direction from the node N311.

The capacitor C301 is interposed between a node N321 (junction between the diodes D301 and D302) and a learning control terminal Rd. The capacitor C302 is interposed between the node N322 and a learning control terminal D. The resistor R301 is serially connected between the node N311 and the first electrode of the capacitor C201.

The capacitor C301 and the diodes D301 and D302 provide a path for extracting positive electric charges which are stored in the capacitor C201 in response to a control signal supplied to the learning control terminal Rd. The diodes D303 and D304 and the capacitor C302 provide a path for injecting positive charges into the capacitor C201 in response to a control signal supplied to the learning control terminal D.

The excitatory synapse load correction circuit 735 corrects the excitatory synapse load value which is stored in the synapse load storing circuit 725. The synapse load correction circuit 735 includes diodes D305, D306, D307 and D308, capacitors C303 and C304, and a resistor R302.

The diodes D306 and D305 are serially connected between a node N312 and the source voltage node Vdd in a forward direction from the node N312. The diodes D307 and D308 are serially connected between the node N312 and the bias voltage node Vd in a reverse direction from the node N312.

The capacitor C303 is interposed between a node N323 (junction between the diodes D305 and D306) and a learning control terminal I.

The capacitor C304 is interposed between a node N324 (junction between the diodes D307 and D308) and a learning control terminal Ri.

The resistor R302 is serially interposed between the nodes N312 and N212. The diodes D306 and D305 provide a path for injecting negative electric charges into the capacitor C202, and the diodes D307 and D308 provide a path for extracting negative electric charges from the capacitor C202.

In general, the bias voltage Vb and the power source voltage Vdd satisfy the following relation:

$$VGND \leq Vb \leq Vdd$$

where VGND represents the voltage of a second reference potential GND, which is the ground potential, for example.

The operation is now described. In the following description, signal input terminals and signals supplied to the respective input terminals are denoted by the same symbols.

The operation of the synapse connection expressing circuit 701 is now described. In the current passing circuit provided by the p-channel MIS transistors TP1 and TP2, the p-channel MIS transistor TP2 is in an OFF state when a state signal voltage Vs (expressing a state "1" by a high level and a state "0" by a low level) supplied to its gate is at a high level. Therefore, no current flows from the source voltage node Vdd to the signal current output node Io. In general, a voltage Vio which is applied to the output node Io is provided in the following relational expression:

$$VGND \leq Vio \leq Vb$$

When the state signal voltage Vs is at a low level, on the other hand, the p-channel MIS transistor TP2 enters an ON state. In this case, therefore, a constant current which is determined by the bias voltage Vb supplied to the gate of the p-channel MIS transistor TP1 flows from the source voltage node Vdd through the transistors TP1 and TP2.

In the current passing circuit provided by the p-channel MIS transistors TP3 and TP4 and that by the p-channel MIS transistors TP5 and TP6, an inverted signal of the state signal voltage Vs is supplied to the gates of the transistors TP4 and TP6 through the inverter (formed of the transistors TP7 and TN1). When the state signal voltage Vs is at a high level, therefore, a constant current which is determined by the gate voltages of the transistors TP3 and TP5 flows from the source voltage node Vdd to the signal current output node Io. When the state signal voltage Vs is at a low level, on the other hand, both p-channel MIS transistors TP4 and TP6 enter OFF states and hence no current flows in the current passing circuits.

Thus, the current passing circuit which comprises the transistors TP1 and TP2 and the two current passing circuits which comprises the p-channel MIS transistors TP3 to TP6 complementarnily operate in response to the state signal voltage Vs, to feed a current from the source voltage node Vdd to the output node Io.

The gate voltages of the p-channel MIS transistors TP3 and TP5 determining the current which flows to the signal current output node Io when the state signal voltage Vs is at a high level are set by the amounts of electric charges which are stored in the capacitors C201 and C202 respectively. Namely, the following voltage is developed a the node N212 which is connected to the gate of the p-channel MIS transistor TP5:

$$Vp = Vdd - Q2 \cdot C2$$

where C2 represents the capacitance of the capacitor C202, and $-Q2$ represents the amount of electric charges stored in the electrode of the capacitor C202 which is connected to the node N212.

On the other hand, the following voltage is developed at the node N211 which is connected to the gate of the p-channel MIS transistor TP3:

$$Vn = Vb + Q1 \cdot C1$$

where C1 represents the capacitance of the capacitor C201, and Q1 represents the amount of electric charges stored in the electrode of the capacitor C201 which is connected to the node N211.

Therefore, when the state signal voltage Vs is at a high level, no current flows in the current passing circuit which comprises the transistors TP5 and TP6 in the case of $-Q2=0$, while the transistor TP5 enters a deep ON state to increase the current as the absolute value of $-Q2$ is increased.

On the other hand, the current flowing in the current passing circuit which comprises the transistors TP3 and TP4 is in the same quantity as that supplied by the current passing circuit which comprises the transistors TP1 and TP2 when Vs="L" since the bias voltage Vb is applied to the gate of the transistor TP3, while that current is reduced as the value Q1 is increased. The amount Q1 of electric charges which are stored in the capacitor C201 expresses the inhibitory synapse load value, while the amount Q2 of electric charges which are stored in the capacitor C202 expresses the excitatory synapse load value.

Operations of the synapse load correction circuits 730 and 735 are now described. The synapse load correction circuits 730 and 735 are formed by charge pumping circuits respectively. The charge pumping operations are first described with reference to FIGS. 13A and 13B.

Figure 13A:
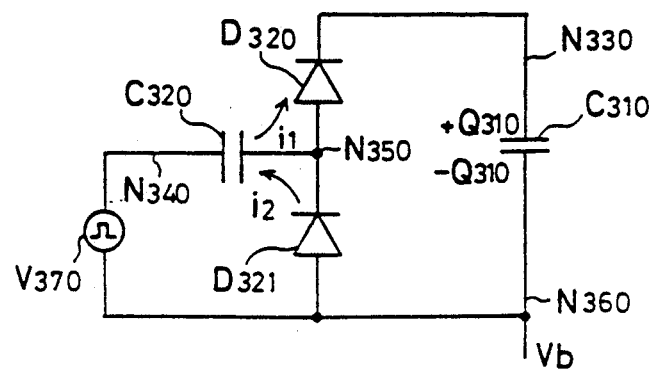
FIGS. 13A and 13B are diagrams for illustrating the operation of a synapse connection expressing circuit shown in FIG. 12.

Referring to FIG. 13A, a charge pumping operation for injecting electric charges into a capacitor C310 is implemented by diodes D320 and D321, a capacitor C320, and a pulsing signal generator V370. The diode D320 has an anode connected to a node N350, and a cathode connected to a first electrode (node N330) of the capacitor C310. The diode D321 has a cathode connected to the node N350, and an anode connected to a second electrode (node N360) of the capacitor C310. The capacitor C320 has a first electrode connected to the pulsing signal generator V370 through a node N340, and a second electrode connected to the node N350. A bias voltage Vb is applied to the node N360. The operation is now described.

Consider that the pulsing signal generator V370 generates a pulsing signal. At this time, the pulsing signal is supplied between the nodes N360 and N340. When the pulsing signal rises from a low level to a high level, the potential of the node N350 rises up through the capacitor C320, so that the diode D320 enters an ON state. Thus, a current i1 flows from the node N350 to the node N330.

When the pulsing signal falls from a high level to a low level, on the other hand, the potential of the node N350 falls in a negative direction, so that the diode D321 enters an ON state. Thus, a current i2 flows from the node N360 to the node N350. Namely, a current flows into the node N330 every cycle of the pulsing signal to charge the capacitor C310, thereby increasing electric charges stored in the capacitor C310. The values of the currents i1 and i2 are determined by capacitances of the capacitors C310 and C320, an amount Q310 of electric charges stored in the capacitor C310, and forward I-V (current-voltage) characteristics of the diodes D320 and D321.

Figure 13B:
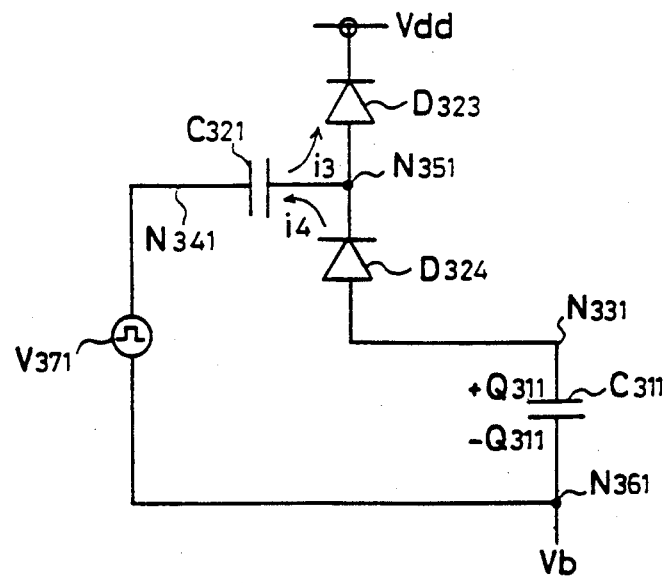

A charge pumping operation for extracting electric charges from a capacitor is now described with reference to FIG. 13B. Referring to FIG. 13B, this charge pumping operation is implemented by diodes D323 and D324 and a capacitor C321. The diode D323 has a cathode connected to a reference voltage node Vdd, and an anode connected to a node N351. The diode D324 has a cathode connected to the node N351, and an anode connected to a first electrode of a capacitor C311 through a node N331.

The capacitor C321 has a first electrode connected to a pulsing signal generator V371 through a node N341, and a second electrode connected to the node N351. A second electrode of the capacitor C311 is connected to a bias voltage node Vb through a node N361. The operation is now described.

The pulsing signal generator V371 is activated to supply a pulsing signal between the node N341 and N361. When the pulsing signal rises from a low level to a high level, electric charges are supplied to the node N351, so that the diode D323 enters an ON state and a current i3 flows from the node N351 to a reference voltage node Vdd. When the pulsing signal falls from a high level to a low level, on the other hand, the potential of the node N351 falls so that the diode D324 enters an ON state and a current i4 flows from the node N331 to the node N351. Namely, a current flows from the node N331 to the node Vdd through the node N351 every cycle of the pulsing signal, so that an amount Q311 of electric charges stored in the capacitor C311 is reduced. The values of the currents i3 and i4 are determined by the capacitance values of the capacitors C311 and C321, the amount Q311 of electric charges stored in the capacitor C311, and forward I-V characteristics of the diodes D323 and D324.

The synapse load correction circuit 730 shown in FIG. 12 can be obtained by connecting the two charge pumping circuits shown in FIGS. 13A and 13B while installing the capacitors C310 and C311 into a common capacitor C201. More specifically, the nodes N330 and N331 shown in FIGS. 13A and 13B are formed into a common node, and the nodes N360 and N361 are formed into a common node. The capacitors C311 and C310 both correspond to the capacitor C201 shown in FIG. 12.

In the structure shown in FIG. 12, a resistor R301 is inserted between the nodes N211 and N311. This resistor R301 serves only to adjust a time for changing the electric charges of the capacitor C201, and no much difference is caused in the charge pumping operation itself even if its resistance value is zero.

The elements shown in FIGS. 13A and 13B correspond to those of the synapse load correction circuit 730 as follows: A common capacitor of the capacitors C310 and C311 shown in FIGS. 13A and 13B corresponds to the capacitor C201 shown in FIG. 12. The diodes D320, D321, D323 and D324 shown in FIGS. 13A and 13B correspond to the diodes D303, D304, D301 and D302 shown in FIG. 12 respectively. The capacitors C320 and C321 shown in FIGS. 13A and 13B correspond to the capacitors C302 and C301 shown in FIG. 12 respectively, and the nodes N340 and N341 shown in FIGS. 13A and 13B correspond to the nodes D and Rd respectively.

When a pulsing signal is supplied to the node Rd, therefore, the amount of electric charges stored in the capacitor C201 is reduced by the diodes D302 and D301, while the same is increased when a pulsing signal is supplied to the node D.

As to the other synapse load correction circuit 725, a common capacitor of the capacitors C310 and C311 shown in FIGS. 13A and 13B similarly corresponds to the capacitor C202. In this case, the first electrode of the capacitor C202 is connected not to the bias voltage Vb but to the reference voltage Vdd.

The diodes D320, D321, D323 and D324 shown in FIGS. 13A and 13B correspond to the diodes D307, D308, D305 and D306 of the synapse load correction circuit 735 respectively.

The capacitors C320 and C321 shown in FIGS. 13A and 13B correspond to the capacitors C304 and C303 of the synapse load correction circuit 735 respectively, while the nodes N340 and N341 shown in FIGS. 13A and 13B correspond to the nodes Ri and I respectively.

When a pulsing signal is supplied to the node Ri, therefore, the amounts of negative electric charges stored in the electrode of the capacitor C202 which is connected to the node N212 is reduced to increase the voltage Vp. When a pulsing signal is supplied to the node I, on the other hand, the amount $-Q2$ of negative electric charges stored in the capacitor C202 is increased by injection of negative electric charges or extraction of positive electric charges through the diode D306, whereby the voltage Vp of the node N212 is reduced.

By the aforementioned structure, increase/decrease of the amounts of electric charges stored in the capacitors C201 and C202 can be adjusted by the numbers of the pulse signals supplied to the nodes Rd, D, I and Ri. Thus, it is possible to control the voltages Vn and Vp of the nodes N211 and N212, which determine the value of the current flowing out from the output terminal Io when the state signal voltage Vs is at a high level.

In the synapse expressing circuit shown in FIG. 12, it is possible to set self organization of the synapse expressing unit in correspondence to the spatial distance between neuron expressing units by frequency-dividing a pulse signal Acp for each synapse expressing unit and supplying the same to the terminals D and I in a learning mode.

The structure and operation of the learning control circuit TC, which supplies control pulse signals to the learning control terminals Rd, D, I and Ri to correct the synapse load value of the synapse expressing circuit shown in FIG. 12 in accordance with a learning rule, are now described.

The learning control circuit TC shown in FIG. 11 receives a control signal Acp which is fixed at a high level in non learning, while it receives a pulsing signal Acp in its terminal P in learning.

In non learning, outputs of the terminals Dp and Ip are fixed at low levels regardless of states of signals which are applied to the terminals S1, S2 and C, and no learning control pulse signal is supplied to the synapse expressing circuit SY. In other words, no synapse load value is corrected in non learning.

In learning, the outputs of the terminals Dp and Ip are changed in accordance with a learning phase indicating signal $C+/-$ which is supplied to the learning control common terminal C. The learning phase indicating signal $C+/-$ goes high in a plus phase, while it goes low in a minus phase.

In the plus phase, the terminal Dp is fixed at a low level while an inverted signal of the pulse signal Acp is supplied at the terminal Ip only when both signals Si and Sj are at high levels, and applied to the terminal I of the correction circuit 735 (see FIG. 12). Thus, the synapse load value is corrected.

When the learning phase instruction signal $C+/-$ applied to the learning control common terminal C goes low, the terminal Ip is fixed at a low level. An inverted signal of the pulse signal Acp is generated from the terminal Dp only when both state signals Si and Sj are at high levels. Thus, the synapse load is changed in the correction circuit 730.

The excitatory synapse load value is increased ($\Delta Wji > 0$) by the number of pulse signals supplied from the terminal Ip, while the inhibitory synapse load value is increased ($\Delta Wji < 0$) by the number of pulse signals supplied from the terminal Dp. In other words, the learning control circuit TC implements learning rules of the following expressions:

$$\Delta W^+ji = \eta \cdot Si \cdot Sj$$

$$\Delta W^-ji = -\eta \cdot Si \cdot Sj$$

The synapse load correction coefficient $\eta$ corresponds to the number of pulse signals supplied to the terminal P. The sign +/− corresponds to the learning phase.

Figure 14:
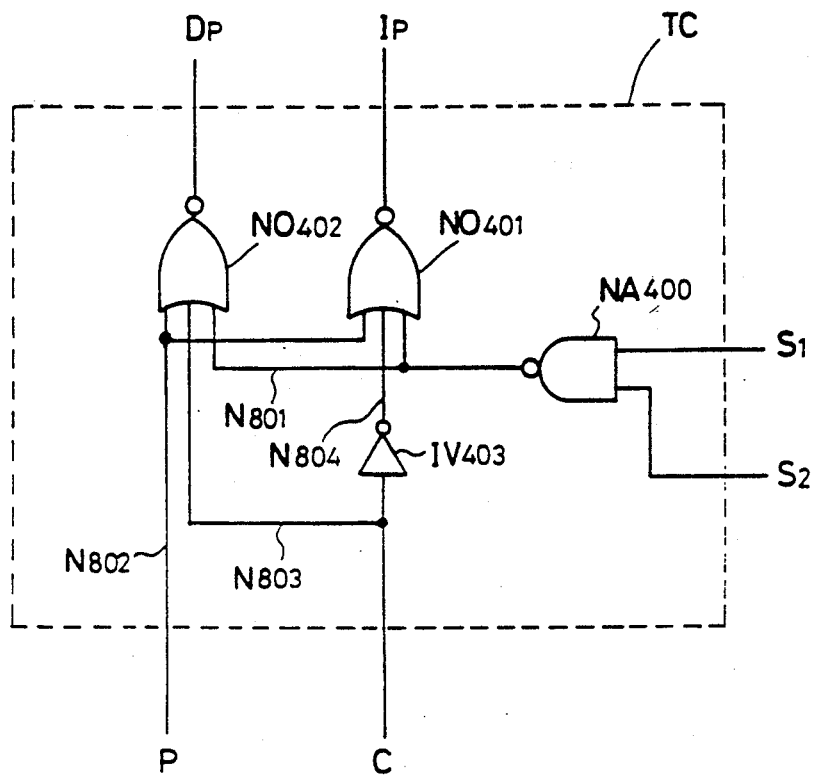
FIG. 14 illustrates an exemplary structure of a learning control circuit shown in FIG. 11.

Thus, it is possible to set the synapse load correction coefficient $\eta$ in correspondence to the distance between neuron expressing units related thereto by frequency-dividing the pulse signal Acp which is supplied to the terminal P indicating learning/non-learning depending on the position in the arrangement of the synapse expressing units. FIG. 14 shows an exemplary concrete structure of the learning control circuit TC.

Referring to FIG. 14, the learning control circuit TC includes a NAND gate NA400, NOR gates N0401 and N0402, and an inverter IV403. The NAND gate NA400 receives state signals S1 and S2. The inverter IV403 receives the learning phase indicating signal C+/− which is supplied to the terminal C. The NOR gate N0401 receives the outputs of the NAND gate NA400 and the inverter IV403, and the learning control signal Acp which is applied to the terminal P.

The NOR gate N0402 receives the learning phase indicating signal C+/− and the learning control signal Acp through the terminals C and P respectively, and also receives the output from the NAND gate NA400.

The NOR gate N0401 supplies a signal for controlling the excitatory synapse load value to the terminal Ip. The NOR gate N0402 derives a control signal for changing the inhibitory synapse load value through the terminal Dp. The operation is now described.

It is assumed that Wji represents the synapse load to be adjusted by the learning control circuits TC. State signals Si and Sj of neurons i and j are supplied to inputs S1 and S2 respectively. An inverted product signal $\overline{Si \cdot Sj}$ appears at an output node N801 of the NAND gate NA400. The learning control signal Acp is transferred to a node N802 through the terminal P. A pulse signal is supplied to the terminal P in learning, while the terminal P is fixed at a high level in non learning. In non learning, therefore, both outputs of the NOR gates N0401 and N0402 are fixed at low levels regardless of input signal states of the input terminals S1, S2 and C, so that no learning control pulse signal is generated and no synapse load value is corrected.

In a plus phase of learning, a high-level signal is supplied to the terminal C. In this case, an input node N803 of the NOR gate N0402 is at a high level, and an input node N804 of the NOR gate N0401 is at a low level. Therefore, an output Dp of the NOR gate N0402 is fixed at a low level. An inverted pulse signal of the signal supplied to the terminal P is generated from a terminal Ip of the NOR gate N0401 since the node N801 goes low only when both state signals Si and Sj are at high levels.

In a minus phase, on the other hand, a low-level signal is supplied to the terminal C. Thus, the output Ip of the NOR gate N0401 is fixed at a low level. The terminal Dp outputs an inverted pulse signal of the signal supplied to the terminal P only when both state signals Si and Sj are at high levels. The pulse signal appearing at the terminal Ip is supplied to the terminal I of the synapse expressing circuit SY, while the pulse signal appearing at the terminal Dp is supplied to the terminal D of the synapse load expressing circuit SY. By this structure, it is possible to obtain a learning control circuit which satisfies the aforementioned learning rules.

A common learning control signal Red is commonly supplied to the learning control terminals Rd and Ri of the synapse expressing circuit SY shown in FIGS. 12 and 11, in order to set zero (reset) the synapse load value by supplying an appropriate number of pulse signals and to avoid a saturated state of the synapse load value. The term "saturated state of the synapse load" indicates such a state that the amounts of electric charges stored in the capacitors C201 and C202 reach the limits and no longer increased even if pulse signals are supplied to the terminals D and I. In this saturated state, correction is made only in such a direction that the electric charges stored in respective capacitors C201 and C202 are reduced. In other words, correction is only made by the pulse signals which are supplied to the terminals Rd and Ri.

When pulse signals are supplied by the signal Red in learning at need, it is possible to reduce both excitatory and inhibitory synapse load values. This common learning control signal Red may be supplied at an appropriate timing in learning, or generated upon termination of every cycle for learning an educator information (pattern).

In the above description, the learning control signal Acp is frequency-divided and supplied to the learning control circuit, thereby setting the synapse load correction coefficient $\eta$ corresponding to the position in the arrangement of the synapse expressing units. Alternatively, it is possible to employ another structure as shown in FIG. 15.

Figure 15:
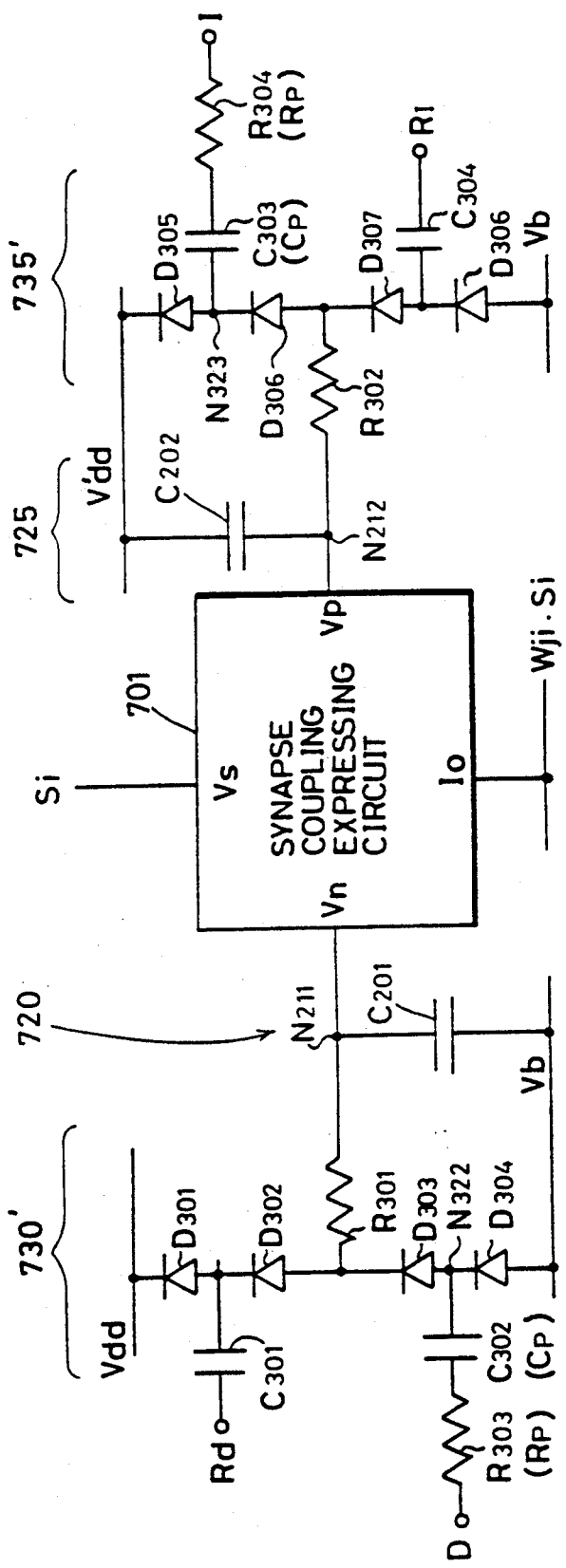
FIG. 15 illustrates a modification of the synapse expressing circuit shown in FIG. 12.

FIG. 15 illustrates the structure of a synapse expressing circuit implementing a self-organizing function according to still another embodiment of the present invention. Referring to FIG. 15, a resistor R303 and a capacitor C302 are serially connected between a learning control terminal D and a node N322 in a correction circuit 730', dissimilarly to the structure shown in FIG. 12. Further, a resistor R304 and a capacitor C303 are serially connected between a learning control terminal I and a node N323 in a correction circuit 735, As hereinabove described, the synapse load correction circuits 730 and 735 shown in FIG. 12 utilize charge pumping operations of the capacitors C302 and C303. In this case, the amounts of increased potentials of the nodes N322 and N323, i.e., the amounts of injected electric charges are proportionate to capacitance values of the capacitors C302 and C303. The respective amounts of electric charges in capacitors C201 and C202 correspond to the synapse load correction coefficient $\eta$. Therefore, a desired effect can be obtained by adjusting the capacitance values of the capacitors C302 and C303 according to the distance between neuron units related thereto.

Resistors R301 and R302 serve to adjust the amounts of electric charges injected into/extracted from the capacitors C201 and C202. If the resistors R301 and R302 have large resistance values, potentials are slowly changed by charging/discharging of the capacitors C201 and C202 since the resistors R301 and R302 are serially connected with the capacitors C201 and C202. The speeds of changes of charge/discharge potentials for the capacitors C201 and C202, i.e., potentials of nodes N211 and N212, are determined by a time constant R·C, which is determined by the capacitance and resistance values of the capacitor C201 (or C202) and the resistor R301 (or R302). Therefore, if the pulse widths of pulse signals which are supplied to terminals D and I as well as the capacitance values of the capacitors C201 and C202 are constant, the amount of the potential change in the capacitor C201 (C202) is reduced as the resistance value of the resistor R301 (R302) is increased, whereby it is possible to effectively reduce the synapse load correction coefficient $\eta$.

Further, if the resistance values of the resistors R303 and R304 are increased, it is possible to reduce the speeds for charging/discharging the capacitors C302 and C303, and to reduce the speeds of potential changes of the nodes N322 and N323. Also in this case, therefore, the amounts of potential changes of the nodes N211 and N212 can be adjusted by adjusting resistance values Rp of the resistors R303 and R304 if the pulse widths of the signals which are supplied to the terminals D and I and capacitance values Cp of the capacitors C302 and C303 are constant, whereby it is possible to adjust the synapse load correction coefficient $\eta$ according to the spatial distance between the neurons related thereto.

Further, it is also possible to effectively adjust the synapse load correction coefficient $\eta$ by adjusting both resistance and capacitance values.

Figure 16A:
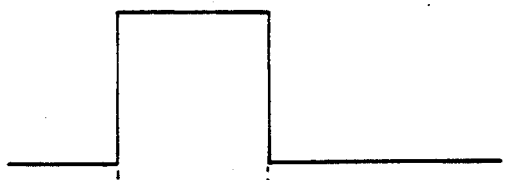
FIGS. 16a and 16b are diagrams illustrating the operation of the circuit shown in FIG. 15.
Figure 16B:
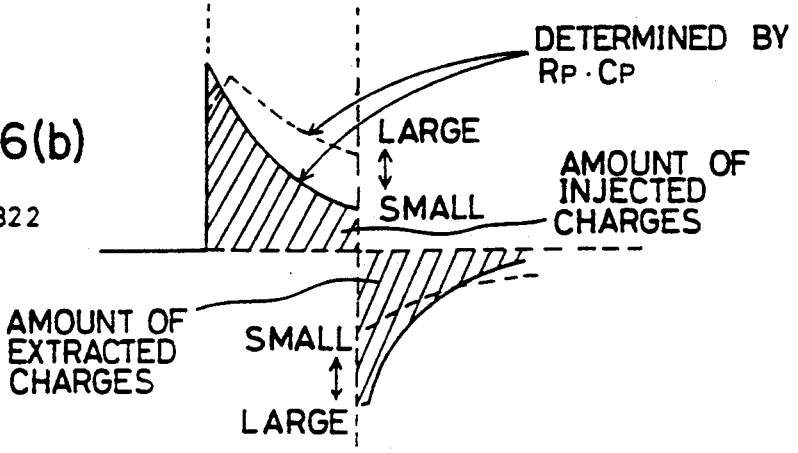

As shown in FIGS. 16a and 16b, the amounts of electric charges injected into the nodes N322 and N323 can be adjusted by adjusting the resistance values Rp of the resistors R303 and R304 and the capacitance values Cp of the capacitors C302 and C303, for example, thereby adjusting the amounts of potential changes of the capacitors C201 and C202, i.e., the synapse load correction coefficient $\eta$, through the nodes N211 and N212.

Figure 17:
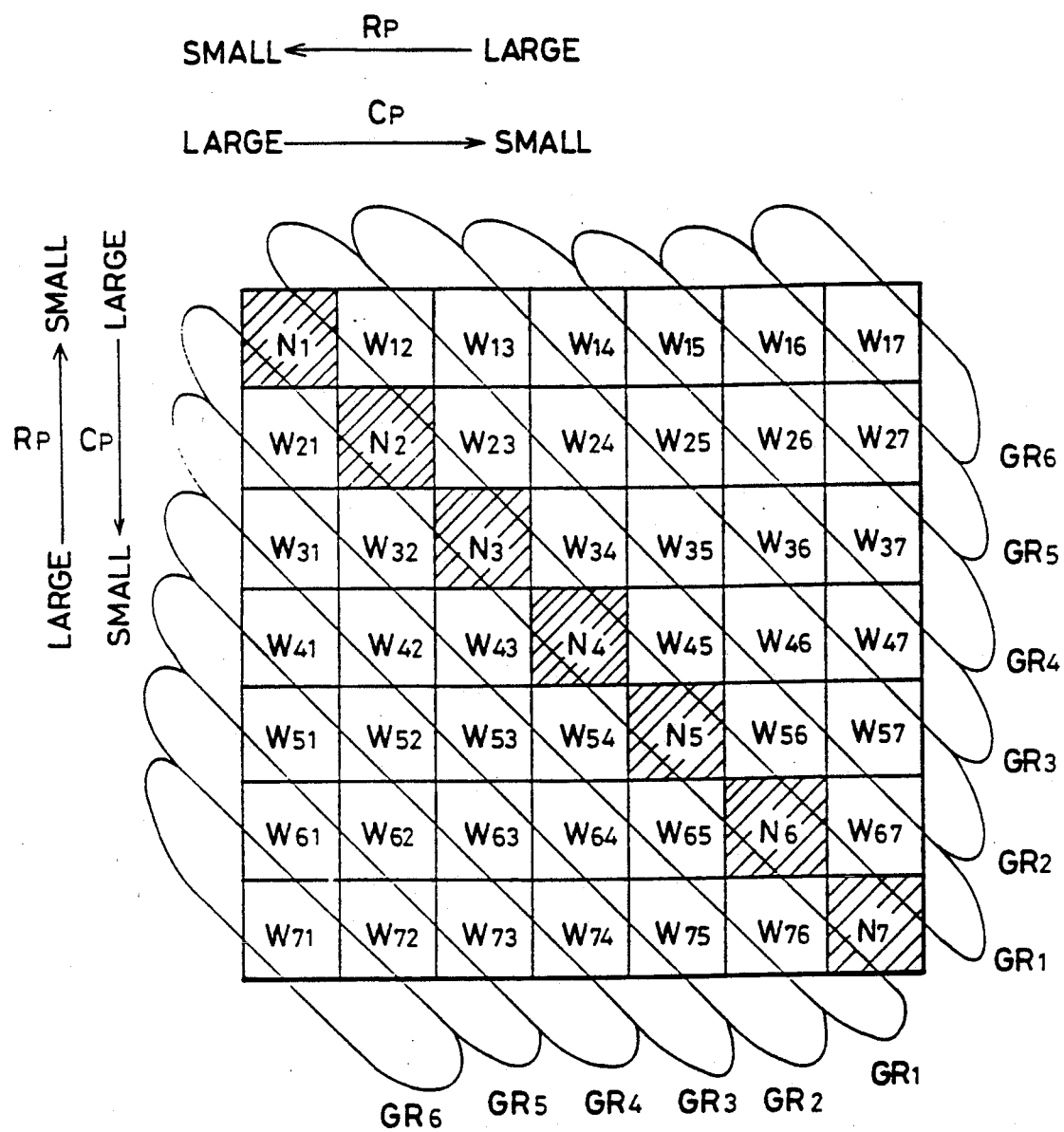
FIG. 17 illustrates distributions of resistance and capacitance values in a neural network representing apparatus employing the synapse expressing circuit shown in FIG. 15.

As shown in FIG. 17, therefore, it is possible to reduce synapse load correction coefficients $\eta$ of synapse expressing units interconnecting remote neurons, by increasing resistance values Rp of resistors R301, R302, R303 and R304 and/or reducing capacitance values Cp of capacitors C302 and C303 in synapse expressing units which are placed far away from a diagonal line on which neuron expressing units are arranged.

In the aforementioned embodiments, the values of the synapse load correction coefficients $\eta$ are adjusted according to the positions in the arrangement of the synapse load expressing units, and the learning speeds are adjusted according to the positions in the arrangement of the synapse expressing units, i.e., the distances between the neuron expressing units related thereto. Alternatively, it is possible to adjust the connection strength itself according to a distance between neurons under a constant learning speed. The potentials Vn and Vp of the nodes N211 and N212 are supplied on the basis of the prescribed voltage Vb and Vdd. Therefore, when the prescribed voltage Vb and Vdd are set according to the positions in the arrangement of the synapse expressing units, i.e., the spatial distances between the neurons related thereto, the connection strength can be adjusted in accordance with the spatial distance between the related neurons, whereby it is possible to implement such a structure that remote neurons are weakly connected. Namely, the connection strength is reduced as Vd and Vbb are reduced, and vice versa.

Although the spatial distances between the neurons are rendered correspondent to physical distances between the neuron expressing units, i.e., spatial distances on the layout in an actual neural network representing apparatus in the above description, the spatial distances between respective neuron expressing units may alternatively be set in accordance with a neural network model to which the present invention is applied.

According to the present invention, as hereinabove described, the synapse load correction coefficient (learning coefficient) $\eta$ is set according to the spatial distance between related neurons so that the synapse load is corrected in consideration of spatial positional information for each neuron in a self-organizing process, whereby it is possible to implement self organization which is approximate to that in a neural network in the actual vital brain. Thus, it is possible to obtain a high-functional neural network representing apparatus which has a function closer to the nature.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An integrated circuit device being modelled on nerve cells, comprising:
    a plurality of neuron-expressing units simulating functions of neurons of nerve cell bodies;
    a plurality of axon-representing signal lines each receiving a signal indicating a state of an associated neuron-representing unit;
    a plurality of dendrite-representing signal lines corresponding to respective ones of said plurality of neuron-expressing units for transferring signals to corresponding neuron-expressing units;
    a plurality of synapse-expressing units on respective crosspoints between said plurality of axon-representing signal lines and said plurality of dendrite-representing signal lines coupling related axon-representing signal lines with related dendrite-representing signal lines with synapse load values indicating connecting strength between an axon-representing signal line and a dendrite-representing signal line, said integrated circuit device operable in a self-organizing manner of correcting a synapse load value in response to externally supplied educator information in accordance with a prescribed learning rule, said learning rule including a synapse load correction coefficient defining an amount of the synapse load value corrected by a single learning operation; and
    means for setting said synapse load correction coefficient in each synapse-expressing unit to a value corresponding to a distance between neuron-expressing units coupled by each respective synapse-expressing unit.

2. An apparatus in accordance with claim 1, wherein said means for setting includes means for setting each said synapse load correction coefficient so that said synapse load correction coefficient is expressed by a monotone decreasing function of said distance.

3. An apparatus in accordance with claim 1, wherein each synapse-expressing unit includes:
  holding means for holding said synapse load value corresponding to a respective synapse-expressing unit, and
  change means for changing said synapse load value held by said holding means in response to a clock signal generated in response to signals indicating states of related two neuron-expressing units in a self-organizing operation, said clock signal defining said synapse load correction coefficient, and
  said setting means includes dividing means provided in correspondence to each synapse-expressing unit for dividing the frequency of the clock signal and transferring the frequency divided clock signal to a corresponding holding means, the frequency dividing ratio of the dividing means is a function of the distance between two neuron-expressing units coupled by a corresponding synapse-expressing unit.

4. An apparatus in accordance with claim 1, wherein each synapse-expressing unit includes:
  holding means for holding said synapse load value corresponding to a respective synapse-expressing unit,
  clock transfer means for transferring a pulsing clock signal generated in a self-organizing operation in response to signals indicating respective states of two neuron-expressing units coupled by a corresponding synapse-expressing unit in said self-organizing operation, and
  change means for changing said synapse load value held by said holding means by counting the pulse number of said clock signal from said clock transfer means, said pulse number providing said synapse load correction coefficient, and
  said setting means includes means for supplying the corresponding synapse-expressing unit with the clock signal at a frequency which is a function of the distance between two neuron-expressing units coupled by the corresponding synapse-expressing unit.

5. An apparatus in accordance with claim 1, wherein each synapse-expressing unit includes:
  capacitance means for holding said synapse load value corresponding to a respective synapse-expressing unit in the form of electric charges,
  clock transfer means for transferring a clock signal, generated in a self-organizing operation, in response to state signals indicating respective states of related two neuron-expressing units, and
  adjusting means for adjusting the amount of said electric charges held in said capacitance means in response to said clock signal from said clock transfer means, said adjusting means including charge pumping means for charging and discharging said capacitance means by a charge pumping function of a capacitor in response to said clock signal, the amount of charging and discharging electric charges supplied by said charge pumping means providing said synapse load corrective coefficient, and
  said setting means includes resistance means provided between said adjusting means and said clock transfer means, the resistance value of said resistance means being increased as the distance between related two neuron-expressing units coupled by the corresponding synapse-expressing unit is increased.

6. An apparatus in accordance with claim 1, wherein each synapse-expressing unit includes:
  capacitance means holding said synapse load value corresponding to a respective synapse-expressing unit in the form of electric charges, and
  clock transfer means for transferring a clock signal generated in a self-organizing operation in response to state signals indicating respective states of related two neuron-expressing units coupled by a corresponding synapse-expressing unit, and
  said setting means includes adjusting means for adjusting the amount of electric charges held by said capacitance means in response to said clock signal from said clock transfer means, said adjusting means including charge pumping means for charging and/or discharging said capacitance means by a charge pumping function of a capacitor in response to said clock signal, the amount of charging and/or discharging electric charges supplied by said charge pumping means providing said synapse load corrective coefficient,
  the capacitance value of said capacitor of said charge pumping means being reduced as the distance between said related two neuron-expressing units is increased.

7. An apparatus in accordance with claim 1, wherein each synapse-expressing unit includes:
  capacitance means holding said synapse load corresponding to a respective synapse-expressing unit in the form of electric charges,
  clock transfer means for transferring a clock signal generated in a self-organizing operation in response to state signals indicating respective states of related two neuron-expressing units coupled by a corresponding synapse-expressing unit, and
  adjusting means for adjusting the amount of electric charges held in said capacitance means in response to said clock signal from said clock transfer means, said adjusting means including charge pumping means for charging and discharging said capacitance means by a charge pumping function of a capacitor in response to said clock signal, the amount of charging and discharging electric charges supplied by said charge pumping means defining said synapse load correction coefficient, and
  said setting means includes means for dividing the frequency of said clock signal and supplying the same to said clock transfer means, the frequency dividing ratio of said means for dividing is a function of the distance between said related two neuron expressing-units.

8. An apparatus in accordance with claim 1, wherein each synapse-expressing unit includes:
  capacitance means holding said synapse load value corresponding to a respective synapse-expressing unit in the form of electric charges, and
  clock transfer means for transferring a clock signal generated in a self-organizing operation in response to state signals indicating respective states of related two neuron-expressing units coupled by a corresponding synapse-expressing unit, and
  said setting means includes:
  charge pumping means for charging and discharging said capacitance means by a charge pumping function of a capacitor in response to said clock signal, the amount of charging and/or discharging electric charges supplied by said charge pumping means defining said synapse load correction coefficient, and resistance means provided between an output of said clock transfer means and an input of said charge pumping means, a product of the capacitance value of said capacitor provided in said charge pumping means and the resistance value of said resistance means being reduced as the distance between said related two neuron-expressing units is increased.

9. An integrated circuit device being modelled on nerve cells, comprising:

a plurality of neuron-expressing units simulating functions of neurons of nerve cell bodies;

a plurality of axon-representing signal lines each receiving a signal indicating a state of an associated neuron-representing unit;

a plurality of dendrite-representing signal lines corresponding to respective ones of said plurality of neuron-expressing units for transferring signals to corresponding neuron-expressing units;

a plurality of synapse-expressing units on respective crosspoints between said plurality of axon-representing signal lines and said plurality of dendrite-representing signal lines coupling related axon-representing signal lines with related dendrite-representing signal lines with synapse load values indicating connecting strength between an axon-representing signal line and a dendrite-representing signal line, said integrated circuit device operable in a self-organizing manner of correcting a synapse load value in response to externally supplied educator information in accordance with a prescribed learning rule, said learning rule including a synapse load correction coefficient defining an amount of the synapse load value corrected by a single learning operation, said synapse load correction coefficient being a positive constant commonly determined for all said synapse-expressing units; and means for changing said connecting strength indicated by each respective synapse load value to a quantity which is a function of a distance between two neuron-expressing units coupled by each respective synapse-expressing unit.

10. An apparatus in accordance with claim 9, wherein each synapse-expressing unit includes:

capacitance means holding said synapse load value corresponding to a respective synapse-expressing unit in the form of electric charges, said capacitance means including first capacitance means provided between a first potential source and a first output terminal and second capacitance means provided between a second potential source and a second output terminal, clock transfer means for transferring a clock signal generated in a self-organizing operation in response to state signals indicating respective states of related two neuron-expressing units coupled by a corresponding synapse-expressing unit, change means for changing the amount of said electric charges held by said capacitance means in response to said clock signal from said clock transfer means, said change means including charge pumping means for charging and discharging said capacitance means by a charge pumping function of a capacitor in response to said clock signal, the amount of charging and/or discharging electric charges supplied by said charge pumping means providing said synapse load correction coefficient, and conversion means for deriving a current signal in response to state signals indicating states of said related two neuron-expressing units, said current signal indicating a produce of said state signals and said synapse load value, said change means including means for setting potentials of said first and second potential sources at values according to the distance between said related two neuron-expressing units.

* * * * *